(12) United States Patent
Koo et al.

(10) Patent No.: US 10,812,418 B2
(45) Date of Patent: Oct. 20, 2020

(54) MESSAGE GENERATION METHOD AND WEARABLE ELECTRONIC DEVICE FOR SUPPORTING THE SAME

(71) Applicant: Samsung Electronics Co., Ltd., Suwon-si, Gyeonggi-do (KR)

(72) Inventors: Ja Ok Koo, Yongin-si (KR); Eun Bi Kim, Seoul (KR); Soo Yeun Yang, Seoul (KR); Jung Yeob Oh, Seongnam-si (KR); Keum Koo Lee, Yongin-si (KR); Soo Jung Lee, Seoul (KR); Soon Kyu Jang, Gwacheon-si (KR); Sun Mi Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 15/872,399

(22) Filed: Jan. 16, 2018

(65) Prior Publication Data

US 2018/0205675 A1 Jul. 19, 2018

(30) Foreign Application Priority Data

Jan. 17, 2017 (KR) .................. 10-2017-0008296

(51) Int. Cl.
*H04L 12/58* (2006.01)
*H04W 4/12* (2009.01)
(Continued)

(52) U.S. Cl.
CPC .......... *H04L 51/02* (2013.01); *G06F 3/0233* (2013.01); *G06F 3/0338* (2013.01);
(Continued)

(58) Field of Classification Search
CPC ....... H04L 51/02; H04L 51/10; G06F 3/0362; G06F 3/03547; G06F 3/0338;
(Continued)

(56) References Cited

U.S. PATENT DOCUMENTS 9,148,750 B2 9/2015 Murakami
2003/0110450 A1* 6/2003 Sakai .................... G06F 17/214
715/256
(Continued)

FOREIGN PATENT DOCUMENTS

WO 2016/203805 A1 12/2016

OTHER PUBLICATIONS

International Search Report dated May 4, 2018, issued in International Application No. PCT/KR2018/000755.
(Continued)

*Primary Examiner* — Aaron N Strange
(74) *Attorney, Agent, or Firm* — Jefferson IP Law, LLP

(57) ABSTRACT

A wearable electronic device for transmitting and receiving a message with an external device is provided. The electronic device includes a display, a memory, a communication interface, a sensor module configured to sense at least one of a state of the wearable electronic device or a state of a user, an input device configured to receive at least one of a movement input or a rotation input, and at least one processor. The at least one processor is configured to, in response to receiving the message from the external device, enter an easy message mode depending on a predetermined condition, analyze the message to generate a plurality of reply messages, and change the plurality of reply messages in response to a user input to the input device.

15 Claims, 19 Drawing Sheets

(51) Int. Cl.

| | | |
|---|---|---|
| *G06F 3/0338* | (2013.01) | |
| *G06F 3/0354* | (2013.01) | |
| *G06F 3/0362* | (2013.01) | |
| *G06F 3/0481* | (2013.01) | |
| *G06F 3/023* | (2006.01) | |
| *G06F 3/0487* | (2013.01) | |
| *G06F 3/0488* | (2013.01) | |
| *G06F 3/0482* | (2013.01) | |
| *G06F 3/0484* | (2013.01) | |
| *G06T 13/80* | (2011.01) | |

(52) U.S. Cl.
CPC ........ *G06F 3/0362* (2013.01); *G06F 3/03547* (2013.01); *G06F 3/0482* (2013.01); *G06F 3/0487* (2013.01); *G06F 3/04817* (2013.01); *G06F 3/04847* (2013.01); *G06F 3/04883* (2013.01); *H04L 51/10* (2013.01); *H04W 4/12* (2013.01); *G06T 13/80* (2013.01)

(58) Field of Classification Search
CPC ............. G06F 3/04847; G06F 3/04817; G06F 3/04883; G06F 3/0482; G06F 3/0233; G06F 3/0487; H04W 4/12; G06T 13/80
See application file for complete search history.

(56) References Cited

U.S. PATENT DOCUMENTS

| | | | |
|---|---|---|---|
| 2009/0219304 A1* | 9/2009 | Martin | H04N 21/4314 345/684 |
| 2012/0040647 A1 | 2/2012 | Kato | |
| 2013/0021176 A1* | 1/2013 | Tu | H04W 4/40 340/994 |
| 2014/0106677 A1 | 4/2014 | Altman | |
| 2014/0194064 A1* | 7/2014 | Murakami | H04W 4/80 455/41.2 |
| 2014/0247210 A1* | 9/2014 | Henderek | G06F 3/0481 345/156 |
| 2014/0324414 A1 | 10/2014 | Zhang et al. | |
| 2015/0200876 A1* | 7/2015 | Richman | H04L 51/02 709/206 |
| 2016/0037311 A1* | 2/2016 | Cho | G06Q 10/00 455/466 |
| 2016/0065509 A1* | 3/2016 | Yang | H04L 51/22 715/752 |
| 2016/0065727 A1 | 3/2016 | Yeon | |
| 2016/0117147 A1* | 4/2016 | Zambetti | G06F 3/0236 715/727 |
| 2016/0134744 A1* | 5/2016 | de la Fuente Sanchez | H04W 4/80 455/418 |
| 2016/0259526 A1 | 9/2016 | Lee et al. | |
| 2016/0306800 A1* | 10/2016 | Son | H04L 51/02 |
| 2016/0308794 A1* | 10/2016 | Kim | H04L 51/02 |
| 2016/0309307 A1 | 10/2016 | Agarwal et al. | |
| 2017/0180276 A1* | 6/2017 | Gershony | G06F 3/0481 |
| 2017/0222961 A1* | 8/2017 | Beach | H04L 51/16 |
| 2018/0077543 A1 | 3/2018 | Cho | |
| 2018/0083894 A1* | 3/2018 | Fung | H04L 51/02 |
| 2018/0083895 A1* | 3/2018 | Pham | H04L 51/02 |
| 2018/0083901 A1* | 3/2018 | McGregor, Jr. | H04L 51/10 |
| 2018/0145935 A1* | 5/2018 | Blokhin | H04L 51/02 |
| 2018/0309706 A1* | 10/2018 | Kim | G06F 3/023 |

OTHER PUBLICATIONS

European Office Action dated Aug. 6, 2019, Reference # P277458EP; Application #/Patent#: 18742342.1-1216 PCT/KR2018000755.

* cited by examiner

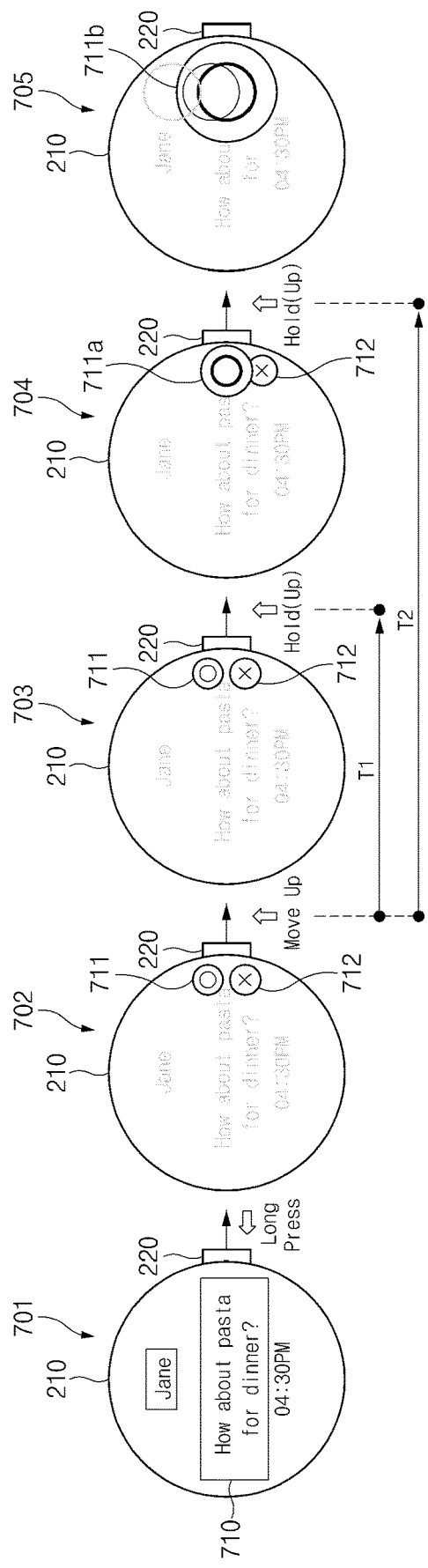
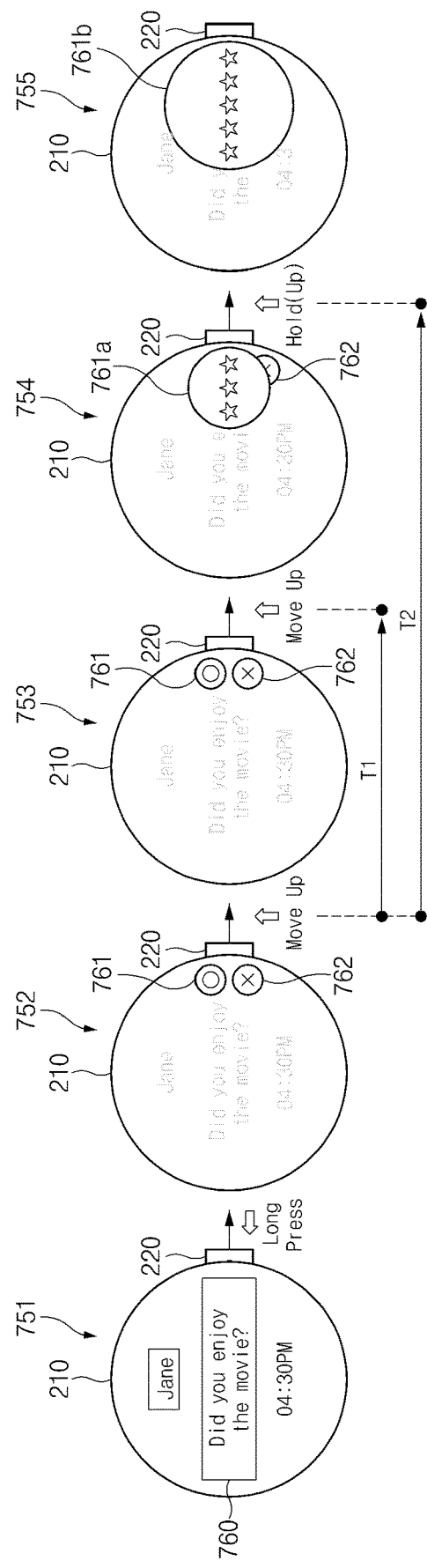
FIG.7A
FIG.7B

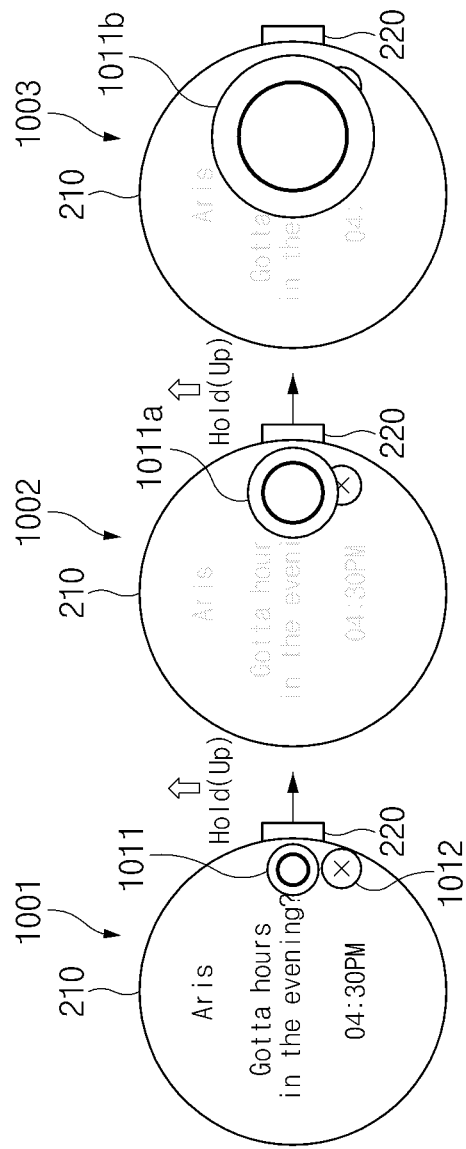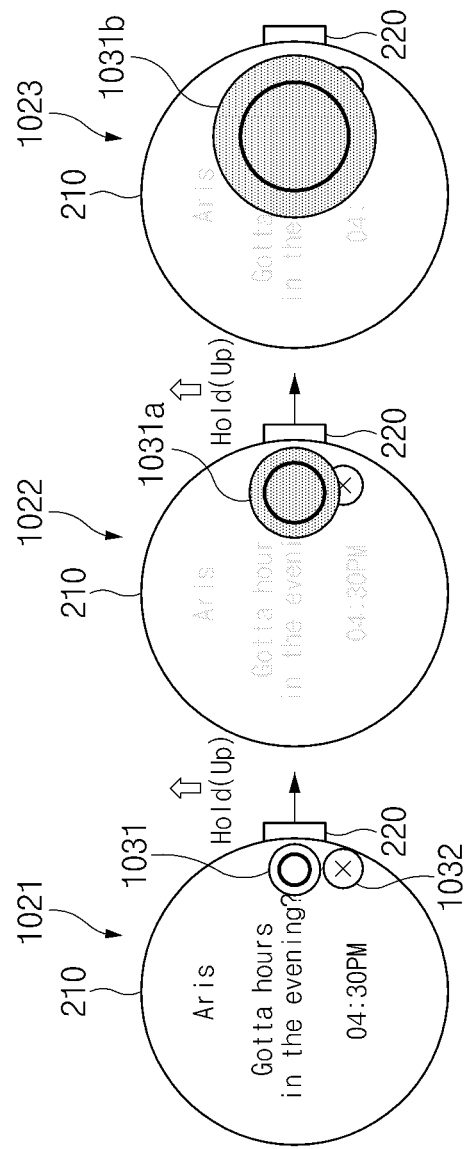
FIG.10A
FIG.10B

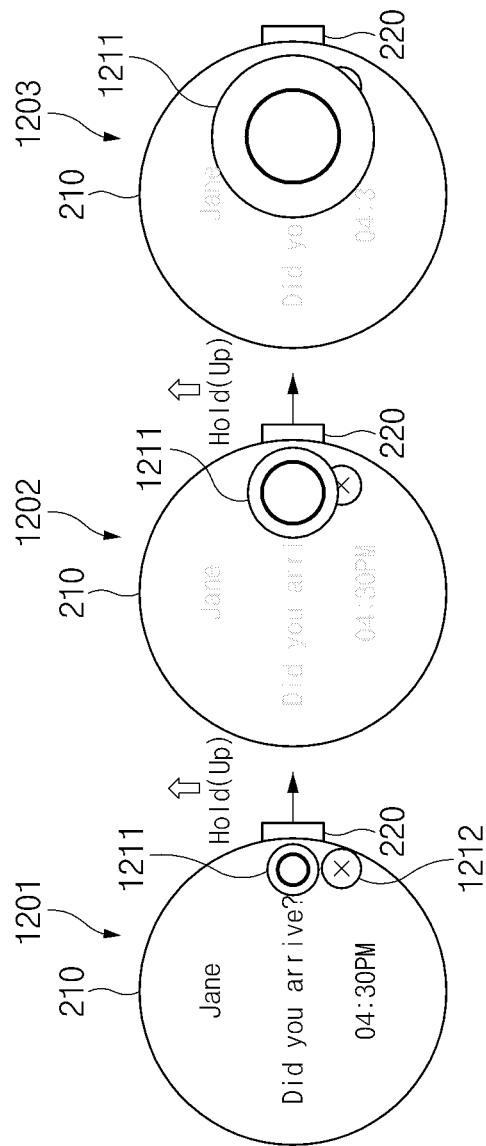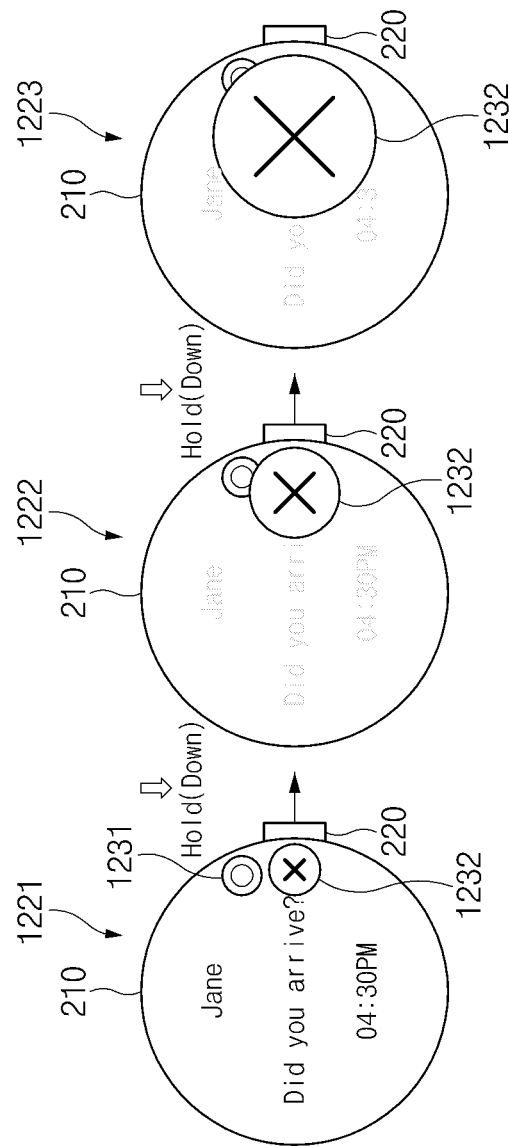

MESSAGE GENERATION METHOD AND WEARABLE ELECTRONIC DEVICE FOR SUPPORTING THE SAME

CROSS-REFERENCE TO RELATED APPLICATION(S)

This application claims the benefit under 35 U.S.C. § 119(a) of a Korean patent application filed on Jan. 17, 2017 in the Korean Intellectual Property Office and assigned Serial number 10-2017-0008296, the entire disclosure of which is hereby incorporated by reference.

TECHNICAL FIELD

The present disclosure relates to a method for generating a message capable of being transmitted to an external device and a wearable electronic device for supporting the same.

BACKGROUND

Recently, various types of wearable electronic devices, such as smart watches, smart bands, and smart necklaces, have been developed. Functions of wearable electronic devices tend to be gradually expanded. The wearable electronic device may perform various functions such as a call function, a health management function, a watch function, a message communication function, and a schedule check function.

A user may send a message including texts, images, and icons to an external device using a wearable electronic device (e.g., a smart watch). Since the wearable electronic device has a display which is relatively smaller than devices such as smart phones and tablet personal computers (PCs), it may be difficult to input texts the user wants through the display.

The above information is presented as background information only to assist with an understanding of the present disclosure. No determination has been made, and no assertion is made, as to whether any of the above might be applicable as prior art with regard to the present disclosure.

SUMMARY

A wearable electronic device according to the related art may provide a user interface (UI) for selecting one of previously stored messages of a simple form. A user may rotate a crown attached to the wearable electronic device or rotate a wheel of a bezel to select a message. In this case, intent to be conveyed through a message by the user may fail to be effectively conveyed to a counterpart. Alternatively, the electronic device may recognize a voice of the user and may generate a message. In this case, it is inconvenient for the user to write texts with his or her voice.

Aspects of the present disclosure are to address at least the above-mentioned problems and/or disadvantages and to provide at least the advantages described below. Accordingly, an aspect of the present disclosure is to provide a method for generating a message capable of being transmitted to an external device and a wearable electronic device for supporting the same.

In accordance with an aspect of the present disclosure, a wearable electronic device for transmitting and receiving a message with an external device is provided. The wearable electronic device includes a display, a memory, a communication interface, a sensor module configured to sense at least one of a state of the wearable electronic device or a state of a user, an input device configured to receive at least one of a movement input or a rotation input, and at least one processor. The at least one processor may be configured to, in response to receiving the message from the external device, enter an easy message mode depending on a predetermined condition, analyze the message to generate a plurality of reply messages, and change the plurality of reply messages in response to a user input to the input device.

In accordance with another aspect of the present disclosure, a message generation method and a wearable electronic device for supporting the same according to various embodiments of the present disclosure are provided. The message generation method and a wearable electronic device includes a shuttle button and may simply generate a variety of messages in which intent of a user is reflected by a simple operation of the shuttle button.

The message generation method and the wearable electronic device for supporting the same according to various embodiments of the present disclosure may change a simple message in various forms if an input state for the shuttle button is held.

The message generation method and the wearable electronic device for supporting the same according to various embodiments of the present disclosure may analyze contents of a received message and may change contents or a form of a corresponding simple message.

The message generation method and the wearable electronic device for supporting the same according to various embodiments of the present disclosure may sense a state of a user or a state of the wearable electronic device and may change contents or a form of a corresponding simple message.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A and 7B are drawings illustrating changing a reply message depending on properties of a received message according to various embodiments of the present disclosure;

FIGS. 10A and 10B are drawings illustrating a reply message in which time information is reflected, according to various embodiments of the present disclosure;

FIGS. 12A and 12B are drawings illustrating changing a reply message using information about a counterpart according to various embodiments of the present disclosure;

Throughout the drawings, it should be noted that like reference numbers are used to depict the same or similar elements, features, and structures.

DETAILED DESCRIPTION

Figure 1:
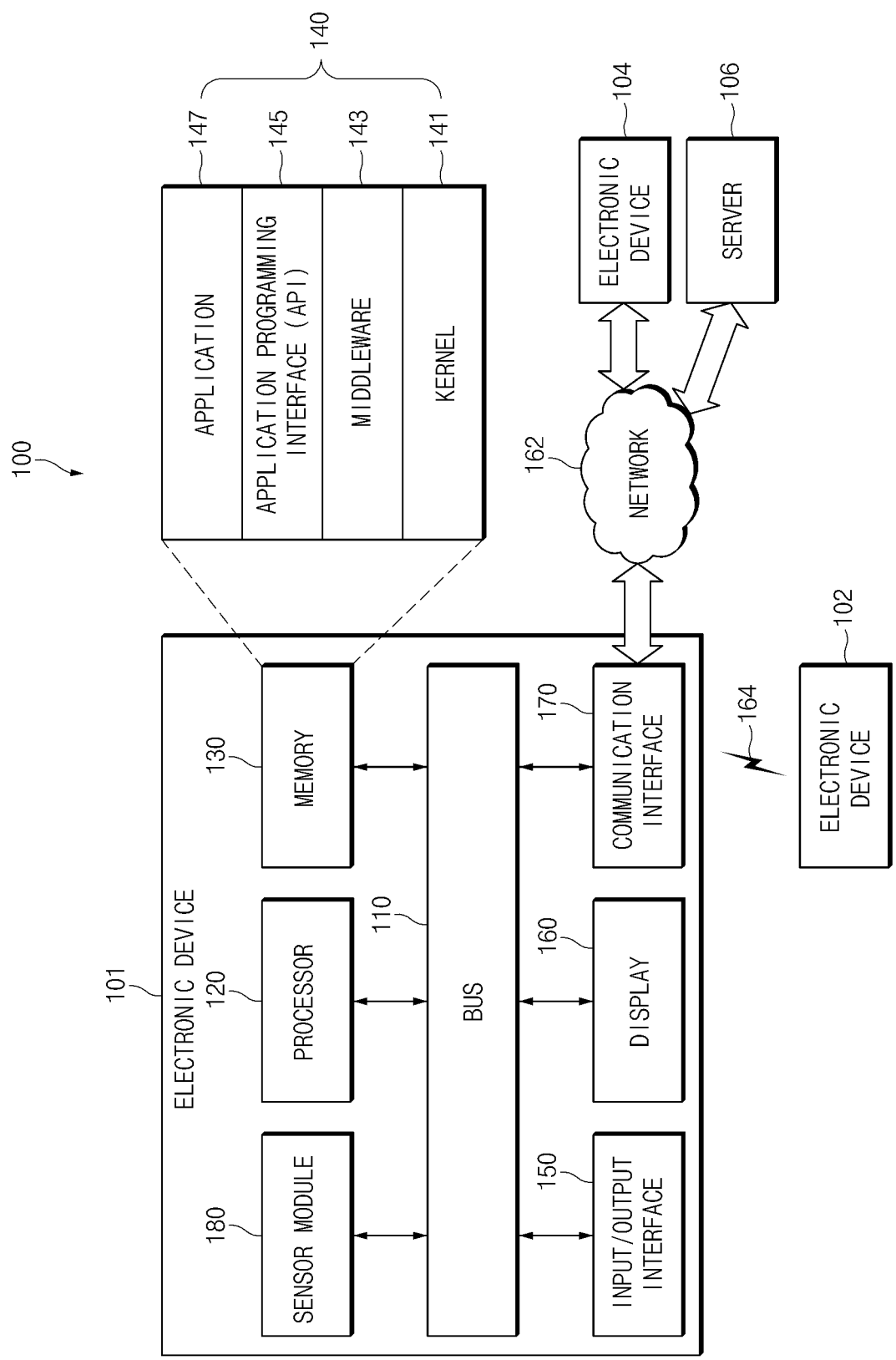
FIG. 1 is a block diagram illustrating an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening elements (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor (AP)) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group (MPEG-1 or MPEG-2) audio layer 3 (MP3) players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital versatile disc (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, wearable electronic devices according to an embodiment of the present disclosure will be described with reference to the accompanying drawings. The term "user" used herein may refer to a person who uses a wearable device or may refer to a device (for example, an artificial electronic device) that uses a wearable device.

FIG. 1 is a block diagram illustrating an electronic device in a network environment according to various embodiments of the present disclosure.

Referring to FIG. 1, a wearable electronic device 101 in a network environment 100 is described in various embodiments. The wearable electronic device 101 may be a device, such as a smart watch, a smart band, or a smart necklace, capable of being used by being worn on a body of a user. The wearable electronic device 101 may include a bus 110, a processor 120, a memory 130, an input/output interface 150, a display 160, a communication interface 170, and a sensor module 180. In some embodiments, the wearable electronic device 101 may fail to include at least one of the elements or may further include another element.

For example, the bus 110 may interconnect the above-described elements 120 to 170 and may include a circuit for conveying communications (e.g., a control message and/or data) among the above-described elements.

The processor 120 may include one or more of a CPU, an AP, or a communication processor (CP). The processor 120 may perform, for example, data processing or an operation associated with control and/or communication of at least one other element(s) of the wearable electronic device 101.

The memory 130 may include a volatile and/or nonvolatile memory. For example, the memory 130 may store instructions or data associated with at least one other element(s) of the wearable electronic device 101. According to an embodiment, the memory 130 may store software and/or a program 140. The program 140 may include, for example, a kernel 141, a middleware 143, an application programming interface (API) 145, and/or an application program (or "application") 147. At least a part of the kernel 141, the middleware 143, or the API 145 may be called an "operating system (OS)".

The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the wearable electronic device 101 so as to control or manage system resources.

The middleware 143 may perform a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the wearable electronic device 101, to at least one of the application program 147. For example, the middleware 143 may process the one or more task requests according to the priority assigned to the at least one, which makes it possible to perform scheduling or load balancing on the one or more task requests.

The API 145 may be an interface through which the application program 147 controls a function provided by the kernel 141 or the middleware 143, and may include, for example, at least one interface or function (e.g., an instruction) for a file control, a window control, image processing, a character control, or the like.

The input/output interface (or an input device) 150 may transmit, for example, instructions or data, input from a user or another element, to other element(s) of the wearable electronic device 101 or may output instructions or data, received from other element(s) of the wearable electronic device 101, to the user or the other external device. In an embodiment, the input/output interface 150 may include at least one of a shuttle button, a bezel wheel, or a bezel touch region as an input device. Additional information about the shuttle button, the bezel wheel, and the bezel touch region may be provided with reference to FIGS. 14 and 15.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, a variety of content (e.g., a text, an image, a video, an icon, a symbol, and/or the like) to the user. The display 160 may include a touch screen and may receive, for example, a touch, a gesture, proximity, or a hovering input using an electronic pen or a part of a user's body.

According to various embodiments, the display 160 may have a relatively small size capable of being worn on a body of the user. For example, if the display 160 is a circle, it may have a size of less than 5 cm in diameter. For another example, if the display 160 is a quadrangular shape, one side may have a length of less than 5 cm.

The communication interface 170 may establish communication between, for example, the wearable electronic device 101 and an external device (e.g., a first external electronic device 102, a second external electronic device 104, or a server 106). For example, the communication interface 170 may be connected to a network 162 through wireless communication or wired communication to communicate with the external device (e.g., the second external electronic device 104 or the server 106).

The wireless communication may include at least one of, for example, long-term evolution (LTE), LTE advance (LTE-A), code division multiple access (CDMA), wideband CDMA (WCDMA), universal mobile telecommunications system (UMTS), wireless broadband (WiBro), or global system for mobile communications (GSM), or the like, as cellular communication protocol. Furthermore, the wireless communication may include, for example, a local area network 164. The local area network 164 may include at least one of wireless fidelity (Wi-Fi), Bluetooth, near field communication (NFC), magnetic stripe transmission (MST), or global navigation satellite system (GNSS), or the like.

The MST may generate a pulse in response to transmission data using an electromagnetic signal, and the pulse may generate a magnetic field signal. The wearable electronic device 101 may transfer the magnetic field signal to point of sales (POS), and the POS may detect the magnetic field signal using a MST reader. The POS may recover the data by converting the detected magnetic field signal to an electrical signal.

The GNSS may include at least one of a global positioning system (GPS), a global navigation satellite system (Glonass), Beidou Navigation Satellite System (hereinafter referred to as "Beidou"), the European global satellite-based navigation system (Galileo), or the like. In this specification, "GPS" and "GNSS" may be interchangeably used.

The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., local area network (LAN) or wide area network (WAN)), an Internet, or a telephone network.

The sensor module 180 (or a sensor unit, a sensor device, or a sensor) may sense a state of the user who wears the wearable electronic device 101 or a state of the wearable electronic device 101. Collected information may be provided to the processor 120 and may be used to generate a message.

Each of the first and second external electronic devices 102 and 104 may be a device of which the type is different from or the same as that of the wearable electronic device 101. According to various embodiments, all or a portion of operations executed by the wearable electronic device 101 may be executed by another or plural electronic devices (e.g., the first electronic device 102, the second external electronic device 104, or the server 106). According to an embodiment, in the case where the wearable electronic device 101 executes any function or service automatically or in response to a request, the wearable electronic device 101 may fail to perform the function or the service internally, but, alternatively or additionally, it may request another electronic device (e.g., the first external electronic device 102, the second external electronic device 104, or the server 106) to perform at least a portion of a function associated with the wearable electronic device 101. The other electronic device (e.g., the first external electronic device 102, the second external electronic device 104, or the server 106) may execute the requested function or additional function and may transmit the execution result to the wearable electronic device 101. The wearable electronic device 101 may provide the requested function or service using the received result or may additionally process the received result to provide the requested function or service. To this end, for example, cloud computing, distributed computing, or client-server computing may be used.

For example, the first external electronic device 102 may be a device, such as a smartphone or a table personal computer (PC), which interworks with the wearable electronic device 101.

Figure 2A:
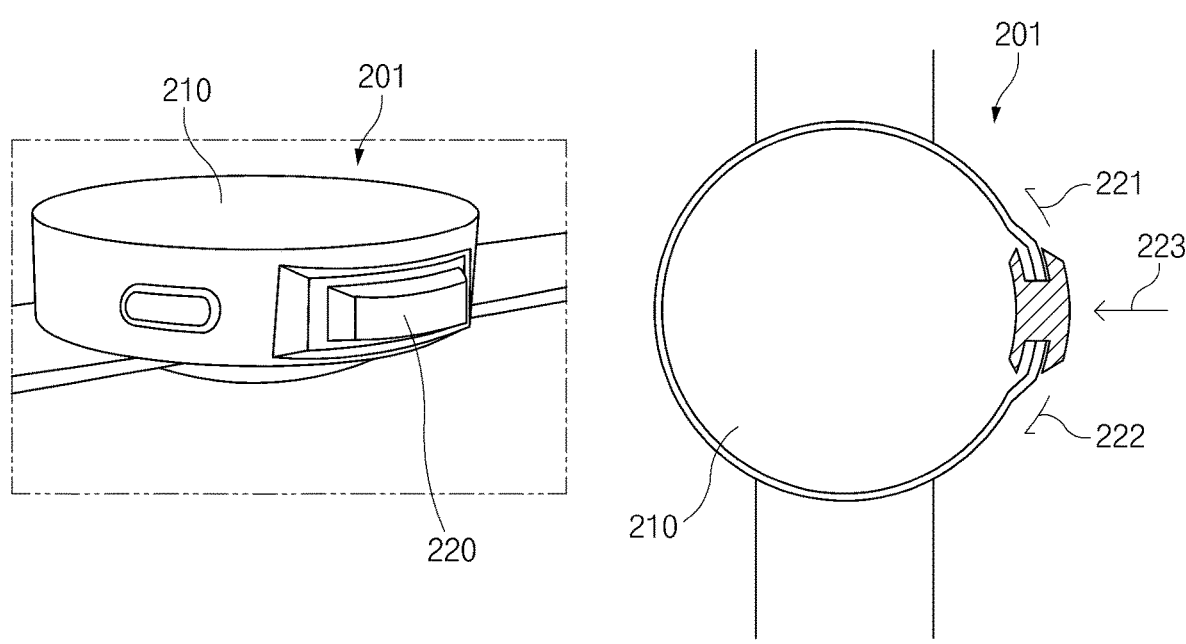
FIG. 2A is a drawing illustrating a wearable electronic device including a shuttle button according to various embodiments of the present disclosure.

FIG. 2A illustrates a wearable electronic device including a shuttle button according to various embodiments of the present disclosure. A wearable electronic device 201 may be an embodiment of a wearable electronic device 101 in FIG. 1. Referring to FIG. 2A, an embodiment is exemplified as the wearable electronic device 201 is a smart watch. However, embodiments are not limited thereto.

Referring to FIG. 2A, the wearable electronic device 201 may include a shuttle button 220 as an input device. The shuttle button 220 may have a form like a crown of a watch, a portion of which protrudes to the outside. A user may move (or rotate) or press a portion of the shuttle button 220 in a specified direction.

According to various embodiments, the shuttle button 220 may generate a different input signal depending on a first direction input 221 (a movement input or a rotation input) (e.g., a rotation input which proceeds in a counterclockwise direction along a side of the wearable electronic device 201), a second direction input 222 (a movement input or a rotation input) (e.g., a rotation input which proceeds in a clockwise direction along a side of the wearable electronic device 201), or a press input 223. Further, the shuttle button 220 may generate a different input signal depending on a duration of each input.

In an embodiment, the first direction input 221 and the second direction input 222 may be used to change an item selected among a plurality of items displayed on a display

210. For example, in a state where a third icon is selected among first to fifth icons capable of being selected by the user, if the first direction input 221 occurs, the second icon may be selected. In the state where the third icon is selected, if the second direction input 222 occurs, the fourth icon may be selected.

In an embodiment, the first direction input 221 and the second direction input 222 may be used to select one of reply messages to a Yes/No question message. For example, in a state where the wearable electronic device 201 receives a message including a Yes/No question, if the user generates the first direction input 221, a Yes message (an O icon) may be selected. In the state whether the wearable electronic device 201 receives the message, if the user generates the second direction input 222, a No message (an X message) may be selected.

According to various embodiments, if the first direction input 221 or the second direction input 222 continues being held during a specified time or more, contents of a reply message displayed on the display 210 may be sequentially changed (e.g., the contents of the reply message may change in size, an animation effect may be applied, or the like). Additional information about in the change in reply message may be provided with respect to a separate drawing.

The press input 223 may be used to execute a selected item. For example, in a state where a reply message is selected by the first direction input 221 or the second direction input 222, if the press input 223 occurs, the reply message may be transmitted to an electronic device of a counterpart.

According to various embodiments, a wearable electronic device transmits and receives a message with an external device. The wearable electronic device includes a display, a memory, a communication interface, a sensor module configured to sense a state of the wearable electronic device and a state of a user, an input device configured to receive a movement input or a rotation input, and a processor, wherein the processor is configured to if receiving the message from the external device, enter an easy message mode depending on a predetermined condition, analyze the message to generate a plurality of reply messages, and change the plurality of reply messages in response to a user input which occurs to the input device.

According to various embodiments, the processor is configured to change the plurality of reply messages based on at least one of a type of the user input, a duration of the user input, or intensity of the user input.

According to various embodiments, the processor is configured to apply different animation effects to the plurality of reply messages, respectively, in response to the user input.

According to various embodiments, each of the plurality of answer messages is configured such that each of the animation effects sequentially increases or decreases.

According to various embodiments, the processor is configured to select a first reply message among the plurality of reply messages in response to a first direction input of the input device, and select a second reply message among the plurality of reply messages in response to a second direction input of the input device.

According to various embodiments, the processor is configured to transmit a message selected between the first reply message or the second reply message to the external device in response to a third direction input of the input device.

According to various embodiments, the processor is configured to determine a change range of the first reply message or the second reply message in response to a duration when the first direction input or the second direction input is held.

According to various embodiments, the processor is configured to change a state of the first reply message or the second reply message based on at least one of a current time, information about the state of the user, or information about the state of the wearable electronic device.

According to various embodiments, the processor is configured to change a state of the first reply message or the second reply message based on at least one of analysis information about the received message or information about a counterpart, the information being stored in the memory.

According to various embodiments, the predetermined condition comprises a condition based on at least one of analysis information about the received message, information stored in the memory, information about the state of the wearable electronic device, or sensing information recognized by the sensor module.

According to various embodiments, the predetermined condition comprises a condition where the received message is a Yes/No question based on the analysis information.

According to various embodiments, the predetermined condition comprises a condition where a predetermined Yes/No question request message is transmitted to the external device and where a corresponding message including a Yes/No question is received from the external device.

According to various embodiments, the request message is generated based on at least one of a time when the message is generated, information about the state of the user, or information about the state of the wearable electronic device.

According to various embodiments, the input device is configured to receive one of a movement input of a shuttle button, a rotation input of a bezel wheel, or a touch input of a bezel.

Figure 2B:
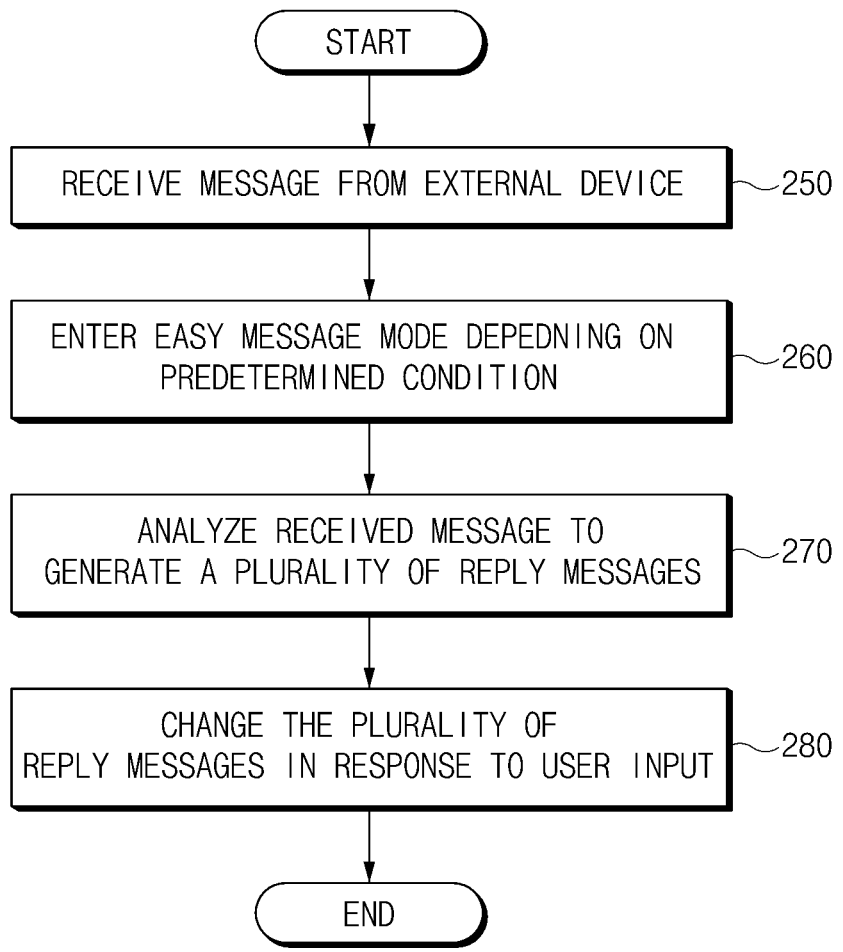
FIG. 2B is a flowchart illustrating a method for generating a reply message according to various embodiments of the present disclosure.

FIG. 2B is a flowchart illustrating a method for generating a reply message according to various embodiments of the present disclosure.

Referring to FIG. 2B, in operation 250, a wearable electronic device 201 of FIG. 2A may receive a message from an external device. For example, the received message may be in the form of including a Yes/No question, in the form of including an interactive question rather than a Yes/No question, in the form of failing to include a separate question, or the like. The wearable electronic device 201 may analyze the received message and may use the analyzed result to generate a reply message.

In operation 260, the wearable electronic device 201 may enter an easy message mode depending on a predetermined condition. The easy message mode may be a mode of generating a Yes/No reply message (or a message to which the Yes/No reply message is changed) through a simple operation of a shuttle button 220 of FIG. 2A (or an operation of a bezel wheel or a touch region input of a bezel) and transmitting the generated reply message to the external device.

According to various embodiments, the predetermined condition may be a condition based on at least one of analysis information about a message received from the external device, information (e.g., an address book, a message transmission and reception history, or the like) stored in a memory of the wearable electronic device 201, information about a state of the wearable electronic device 201 (e.g., location information, movement information, or the like), or information sensed for a user who wears the wearable electronic device 201.

In an embodiment, the predetermined condition may be a condition where a message received from the external device includes a Yes/No question (e.g., "How about meeting tonight?").

In another embodiment, the predetermined condition may be a condition where a message (hereinafter referred to as "request message") for requesting to transmit a message including a Yes/No question is transmitted to a counterpart terminal and where a message (hereinafter referred to as "a corresponding message") including a Yes/No question is received from the counterpart terminal. For example, the request message may be "I'm jogging now, I can reply to O/X." or the like.

In another embodiment, the predetermined condition may be a condition based on information provided from another app rather than a message app. For example, if a counterpart of a specified group sends a message in a contacts app, the wearable electronic device 201 may enter an easy message mode.

In another embodiment, the predetermined condition may be a condition determined that the user is in a specified state (e.g., the user is exercising or driving) using information collected by various sensors.

In operation 270, the wearable electronic device 201 may analyze the message received from the external device to generate a plurality of reply messages. For example, if the received message includes a Yes/No question (e.g., "How about pasta for dinner?") about a preference of the user, the plurality of reply messages may be generated such that an animation of sequentially increasing a bouncing effect is applied. For another example, if a received message has contents (e.g., "Did you enjoy the movie?") about a level, the plurality of reply messages may be generated as images of sequentially increasing a start rating.

In operation 280, the wearable electronic device 201 may change the plurality of reply message in response to a user input which occurs to an input device (e.g., a shuttle button). The wearable electronic device 201 may change the plurality of reply messages based on at least one of a type of the user input, a duration of the user input, or intensity of the user input. For example, the plurality of reply messages may be changed in a specified order in response to a duration where a user input is held.

According to various embodiments, if a first direction input occurs to the input device (e.g., the shuttle button), the wearable electronic device 201 may select a predetermined first reply message. For example, the first direction input may be an up input of the shuttle button 220 (or a rotation input which proceeds in a counterclockwise direction). The first reply message may include an image or text (e.g., O, Okay, Yes, or the like) corresponding to a YES.

According to various embodiments, if a second direction input occurs to the input device (e.g., the shuttle button), the wearable electronic device 201 may select a predetermined second reply message. For example, the second direction input may be a down input of the shuttle button 220 (or a rotation input which proceeds in a clockwise direction). The second reply message may include an image or text (e.g., X, No, or the like) corresponding to a NO.

According to various embodiments, the wearable electronic device 201 may transmit a message selected between the first reply message or the second reply message to the external device in response to a third direction input of the input device (e.g., the shuttle button).

According to various embodiments, a message generation method, performed in a wearable electronic device, may include receiving a message from an external device entering an easy message mode depending on a predetermined condition, analyzing the message to generate a plurality of reply messages, and changing the plurality of reply messages in response to a user input which occurs to the input device.

According to various embodiments, the changing of the plurality of reply messages comprises changing the plurality of reply messages based on at least one of a type of the user input, a duration of the user input, or intensity of the user input.

According to various embodiments, the changing of the plurality of reply messages comprises applying different animation effects to the plurality of reply messages, respectively, in response to the user input.

According to various embodiments, the applying of the different animation effects comprises sequentially increase or decrease each of the animation effects.

According to various embodiments, the message generation method further includes selecting a first reply message among the plurality of reply messages in response to a first direction input of the input device, and selecting a second reply message among the plurality of reply messages in response to a second direction input of the input device.

According to various embodiments, the message generation method further includes if a third direction input occurs to the input device, transmitting the first reply message or the second reply message to the external device.

According to various embodiments, the entering of the easy message mode comprises determining to meet the predetermined condition based on at least one of analysis information about the received message, information stored in the memory, information about a state of the wearable electronic device, or sensing information recognized by the sensor module.

According to various embodiments, the entering of the easy message mode comprises if the received message is a Yes/No question based on the analysis information, entering the easy message mode.

According to various embodiments, the entering of the easy message mode comprises transmitting a predetermined question request message to the external device, and receiving a corresponding message including a Yes/No question from the external device.

According to various embodiments, the transmitting of the request message comprises, generating the request message based on at least one of a time when the message is generated, information about a state of a user, or the information about the state of the wearable electronic device.

Figure 3:
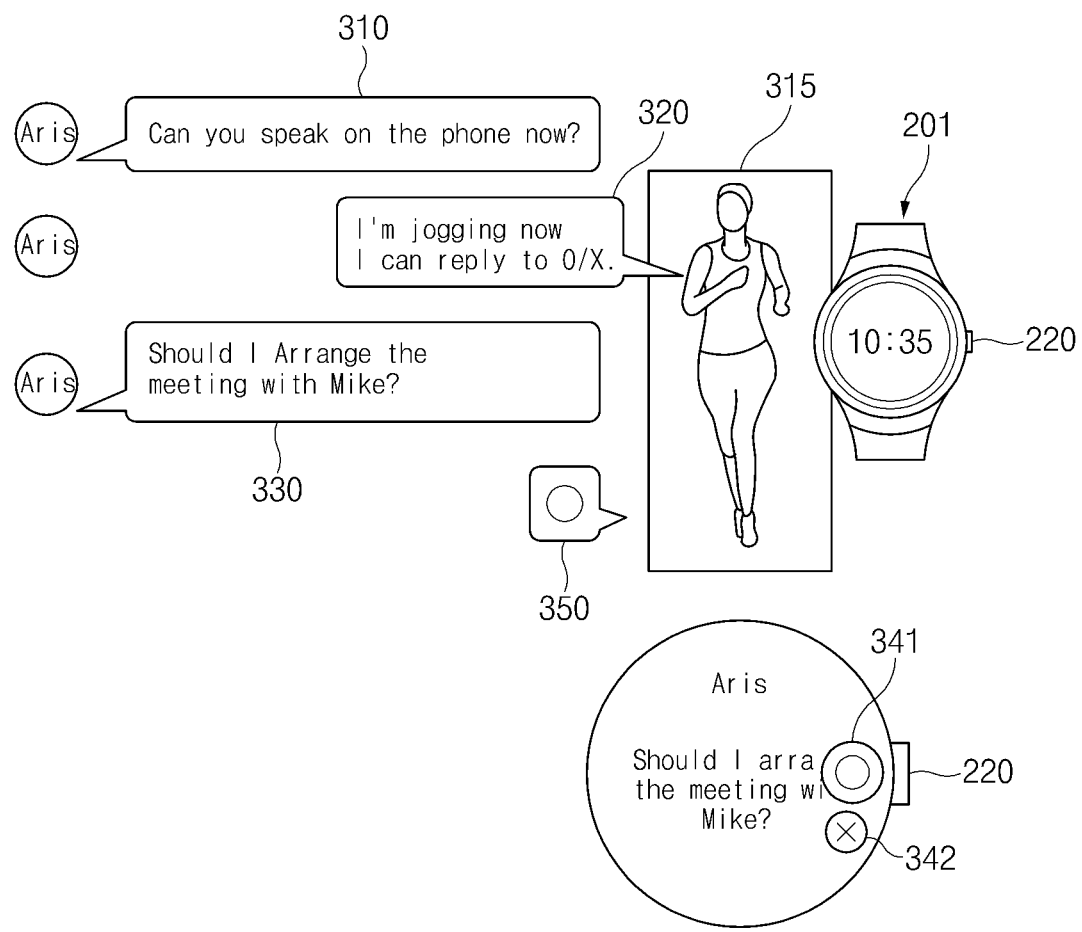
FIG. 3 is a drawing illustrating entering an easy message mode and transmitting a replay message according to various embodiments of the present disclosure.

FIG. 3 is a drawing illustrating entering an easy message mode and transmitting a replay message according to various embodiments of the present disclosure. FIG. 3 is, but is not limited to, an example.

Referring to FIG. 3, a wearable electronic device 201 may receive a message 310 from an external device.

The wearable electronic device 201 may transmit a request message 320 for requesting a user of the external device to request a Yes/No question to the external device. In an embodiment, the request message 320 may be automatically generated and transmitted based on sensing information about a state of a user 315 or a state of the wearable electronic device 201.

For example, if a heart rate of the user 315, sensed using a heart rate sensor, is greater than or equal to a reference value, the wearable electronic device 201 may determine that the user 315 is exercising. The wearable electronic device 201 may automatically transmit the request message 320 to the external device. The wearable electronic device 201 may include a text (e.g., "I'm jogging now") or an image (or icon) (e.g., a jogging image) indicating that the user 315 is exercising in the request message 320.

For another example, if a movement speed of the wearable electronic device 201 is greater than or equal to a specified speed (or if the wearable electronic device 201 is wiredly or wirelessly connected to a car device), the wearable electronic device 201 may determine that the user 315 is driving. The wearable electronic device 201 may automatically transmit the request message 320 to the external device. The wearable electronic device 201 may include a text (e.g., "I'm driving now") or an image (or icon) (e.g., a car image, a steering wheel image, or the like) indicating that the user 315 is driving in the request message 320.

The wearable electronic device 201 may receive a corresponding message 330 including a Yes/No question from the external device in response to the request message 320. If receiving the corresponding message 330, the wearable electronic device 201 may enter an easy message mode.

The wearable electronic device 201 may inform the user 315 that he or she is able to select one of a Yes icon (or image) 341 or a No icon (or image) 342 by an operation of a shuttle button 220 through its display. If the user 315 moves the shuttle button 220 in an upper or lower direction, one of the Yes icon 341 or the No icon 342 may be selected. If the user 315 generates a press input to the shuttle button 220, a reply message 350 corresponding to the selected icon may be transmitted to the external device.

According to various embodiments, if additionally receiving a message including a Yes/No question from the external device, the wearable electronic device 201 may continue maintaining the easy message mode. If receiving another message, the wearable electronic device 201 may end the easy message mode.

Figure 4:
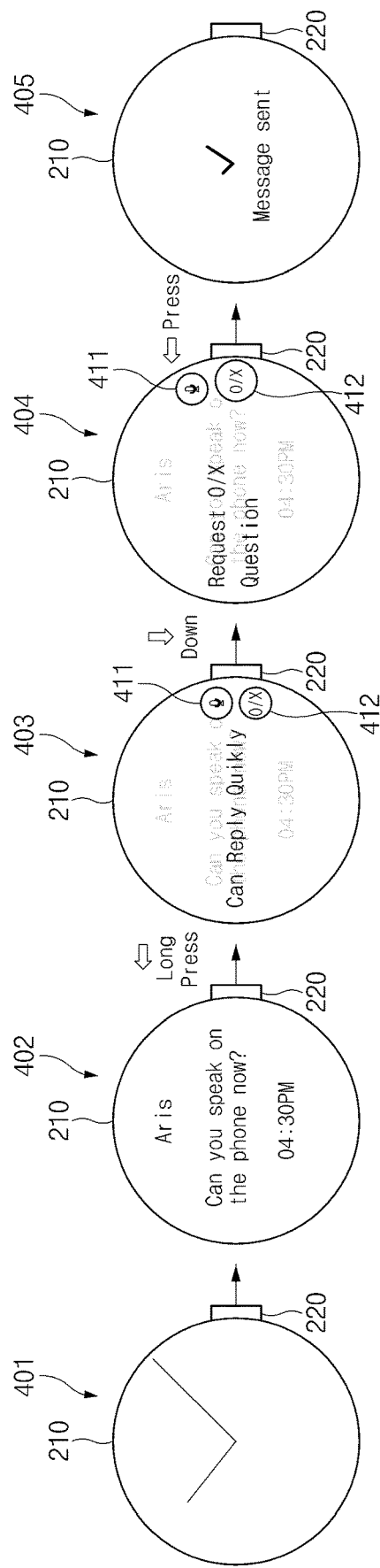
FIG. 4 is a drawing illustrating a screen of transmitting a request message according to various embodiments of the present disclosure.

FIG. 4 is a drawing illustrating a screen of transmitting a request message according to various embodiments of the present disclosure. FIG. 4 is, but is not limited to, an example.

Referring to FIG. 4, on a first screen 401, a wearable electronic device 201 of FIG. 3 may be in a state of waiting for receiving a message. In the waiting state, the wearable electronic device 201 may display a current time or may be in a state where a screen is turned off, in a sleep state, or the like.

On a second screen 402, the wearable electronic device 201 may output a message received from an external device on a display 210. For example, a name, a phone number, message contents, or the like of a person who sends the message may be output. If a user of the wearable electronic device 201 verifies the contents of the message and operates (e.g., long-press) a shuttle button 220, a user interface/user experience (UI/UX) for transmitting a request message may be output.

On a third screen 403, if the user generates a specified input (e.g., a long press) to the shuttle button 220, the wearable electronic device 201 may inform him or her that he or she is able to enter an easy reply mode. For example, the wearable electronic device 201 may output "Can reply quickly" and may output a voice call icon 411 and a request message icon 412 to be output in the same size (in a state where both of the voice call icon 411 and the request message icon 412 are not selected).

On a fourth screen 404, if the user generates a second direction input (e.g., a down input) to the shuttle button 220, the request message icon 412 may be selected. For example, the request message icon 412 may move to a location adjacent to the shuttle button 220, and the request message icon 412 may more increase in size than the voice call icon 411.

On a fifth screen 405, if the user generates a press input to the shuttle button 220, a request message may be transmitted to the external device. If the transmission is completed, the wearable electronic device 201 may output completion information on the display 210.

Referring to FIG. 4, an embodiment is exemplified as the long press of the shuttle button 220, the down input, or the like. However, embodiments are not limited thereto.

Figure 5:
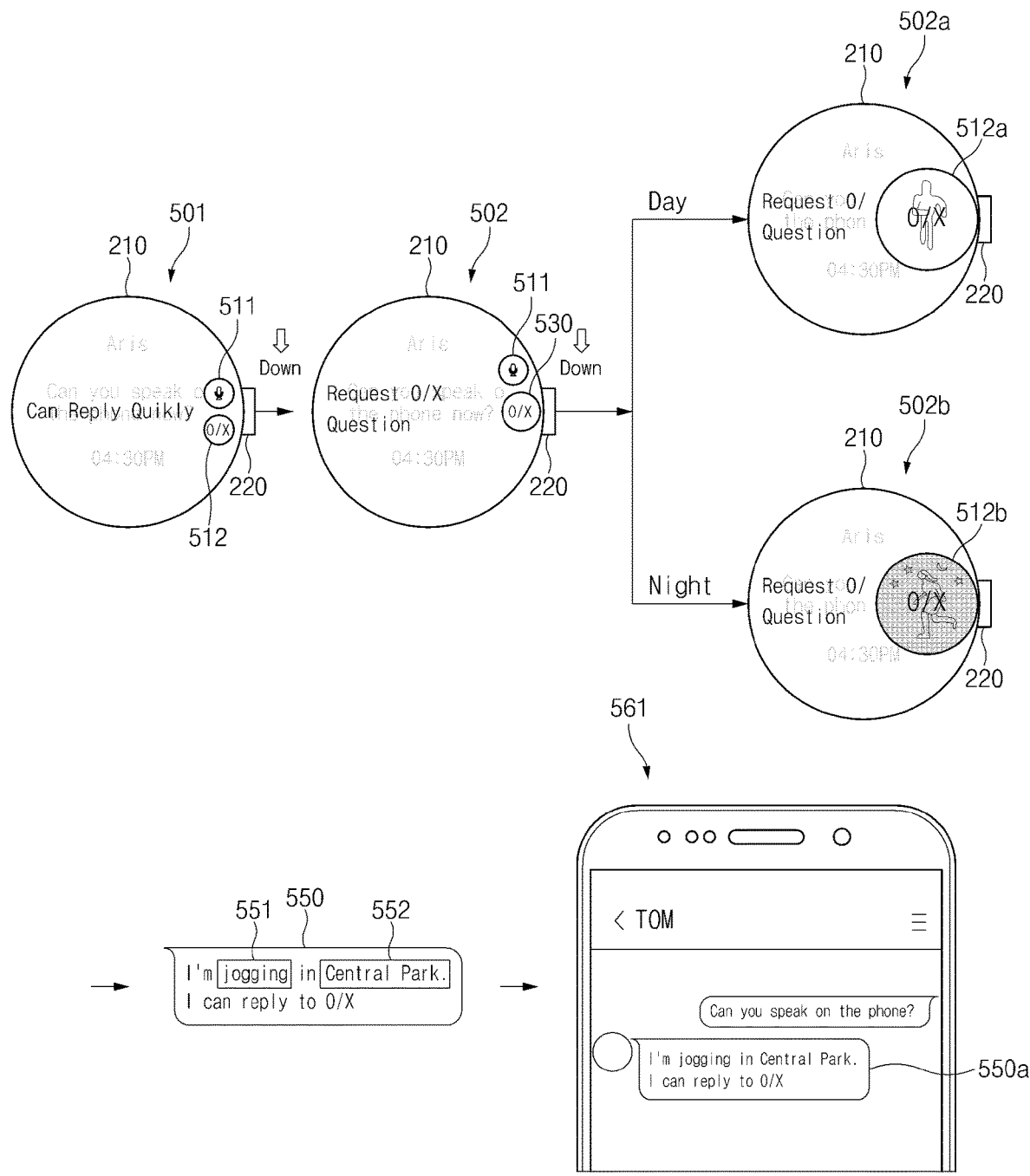
FIG. 5 is a drawing illustrating changing a request message using sensing information according to various embodiments of the present disclosure.

FIG. 5 is a drawing illustrating changing a request message using sensing information according to various embodiments of the present disclosure. FIG. 5 is, but is not limited to, an example.

Referring to FIG. 5, a request message icon 512 may vary based on time information, information about a state of a user, or information about a state of a wearable electronic device 201 of FIG. 3.

For example, on a first screen 501 and a second screen 502, if a user of the wearable electronic device 201 generates a second direction input (e.g., a down input) to a shuttle button 220, the request message icon 512 may be selected. For example, the request message icon 512 may move to a location adjacent to the shuttle button 220, and the request message icon 512 may increase in size more than a voice call icon 511 to become request message icon 530.

On change screens 502a and 502b, if the user holds the shuttle button 220 in a state where he or she moves the shuttle button 220 down, variation icons 512a and 512b, each of which has a changed background image or a changed internal image of the request message icon, may be displayed. For example, if a current time is 3 p.m., a daytime sky background image may be displayed. If the current time is 7 p.m., a night sky background image may be displayed.

According to various embodiments, the wearable electronic device 201 may change the request message icon 512 based on information about a state of the user, collected by a sensor (e.g., a heartbeat sensor). If it is recognized that the user is jogging using a heart rate sensor, a jogging image may be added to the request message icon 512. For another example, if it is recognized that the user is driving or moving using a GPS sensor or an acceleration sensor, a car image may be added to the request message icon 512.

According to various embodiments, the wearable electronic device 201 may generate a request message 550 in the form of corresponding to the variation icons 512a and 512b. The request message 550 may be generated based on time information, information about a state of the user, or information about a state of the wearable electronic device 201.

For example, the request message 550 may include state information (e.g., a running image) of the user in a background image. Alternatively, the request message 550 may include state information 551 of the user (e.g., "I'm jogging") in the form of text. For example, a current location 552 of the user (e.g., Central Part), recognized using the GPS sensor, may be included in the form of text.

For another example, the request message 550 may include information collected by another app. For example, the request message 550 may include a background image using current weather information provided form a weather app.

The wearable electronic device 201 may transmit the request message 550 to an external device 561. For example, in a state where the request message icon 512 is selected, if a press input occurs to the shuttle button 220, the request message 550 may be transmitted.

A received request message 550*a* may be displayed on the external device 561. A user of the external device 561 may verify the request message 550*a* and may transmit a message including a Yes/No question.

Figure 6:
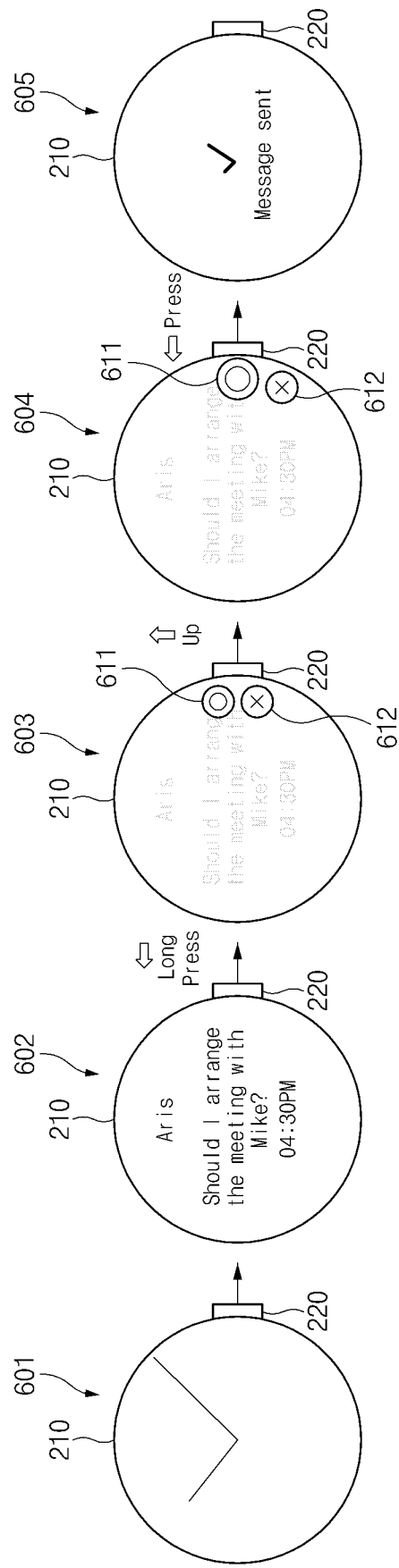
FIG. 6 is a drawing illustrating transmitting a reply message in an easy message mode according to various embodiments of the present disclosure.

FIG. 6 is a drawing illustrating transmitting a reply message in an easy message mode according to various embodiments of the present disclosure. FIG. 6 is, but is not limited to, an example.

Referring to FIG. 6, on a first screen 601, a wearable electronic device 201 of FIG. 3 may be in a state of waiting for receiving a message. In the waiting state, the wearable electronic device 201 may display a current time or may be in a state where a screen is turned off, in a sleep state, or the like.

On a second screen 602, the wearable electronic device 201 may receive a message including a Yes/No question from an external device. In an embodiment, the message may be a message sent from a user of the external device in response to a request message.

On a third screen 603, if a user of the wearable electronic device 201 verifies contents of the message and operates (e.g., long-press) a shuttle button 220, a UI/UX for generating/transmitting a reply message by an easy message mode may be output. The wearable electronic device 201 may output a Yes icon 611 and a No icon 612 in the same size (in a state where both of the Yes icon 611 and the No icon 612 are not selected).

On a fourth screen 604, if the user generates a first direction input (e.g., an up input), the Yes icon 611 may be selected. For example, the Yes icon 611 may move to a location adjacent to the shuttle button 220, and the Yes icon 611 may more increase in size than the No icon 612. Referring to FIG. 6, an embodiment is exemplified as the Yes icon 611 is selected. However, embodiments are not limited thereto. For example, if the user generates a second direction input (e.g., a down input) to the shuttle button 220, the No icon 612 may be selected.

On a fifth screen 605, if the user generates a press input to the shuttle button 220, a first reply message (e.g., a circular emoticon or the like) corresponding to the Yes icon 611 may be transmitted to the external device. If the transmission is completed, the wearable electronic device 201 may output a completion message.

FIGS. 7A and 7B are drawings illustrating changing a reply message depending on properties of a received message according to various embodiments of the present disclosure. FIGS. 7A and 7B are, but are not limited to, examples.

Referring to FIGS. 7A and 7B, a wearable electronic device 201 of FIG. 3 may analyze counterpart information or contents of a received message 710 or 760 and may apply an animation effect or the like to a reply message (or a Yes/No icon). For example, if a group including a counterpart's telephone number is a family or friend group, the wearable electronic device 201 may apply the animation effect. If the group including the counterpart's telephone number is a company or colleague group, the wearable electronic device 201 may fail to apply the animation effect. For another example, if the received message 710 has contents about a preference of a user, the wearable electronic device 201 may sequentially apply an animation effect to a reply message (or a Yes/No icon) (see FIG. 7A). If the received message 710 has contents about a level, the wearable electronic device 201 may sequentially change a score on the reply message (or the Yes/No icon) (see FIG. 7B).

Referring to FIG. 7A, on a first screen 701, the wearable electronic device 201 may receive the message 710 including a Yes/No question from an external device. The message may be a message sent from a user of the external device in response to a request message.

On a second screen 702, if a user of the wearable electronic device 201 verifies contents of the message 710 and operates (e.g., long-press) a shuttle button 220, a UI/UX for generating/transmitting a reply message by an easy message mode may be output. The wearable electronic device 201 may output a Yes icon 711 and a No icon 712 in the same size (in a state where both of the Yes icon 611 and the No icon 612 are not selected).

On a third screen 703, if the user generates a first direction input (e.g., an up input) to the shuttle button 220, the Yes icon 711 may be selected. For example, the Yes icon 711 may move to a location adjacent to the shuttle button 220, and the Yes icon 611 may more increase in size than the No icon 612.

On a fourth screen 704 and a fifth screen 705, if the user continues holding the first direction input, the animation effect applied to the Yes icon 711 may increase over a time when the first direction input is held and thus Yes icon 711 becomes larger Yes icon 711*a* and even larger Yes icon 711*b*.

On the fourth screen 704, if the first direction input is held during time T1, an animation effect in which the Yes icon 711 bounces (e.g., an animation effect in which a circular image is zoomed in/out in place) may be applied. A state where a preference on a selection of the user is high may be sensuously displayed through the animation effect.

On the fifth screen 705, if the first direction input is held during time T2, the animation effect in which the Yes icon 711 bounces (e.g., an animation effect in which the circular image is zoomed in/out while bouncing in an upper and lower direction) may be more increased. A state where the preference for the selection of the user is very high may be sensuously displayed through the animation effect.

Referring to FIG. 7B, an operation manner in first to third screens 751, 752, and 753 may be the same or similar to the operation manner in the first to third screens 701 to 703.

On a fourth screen 754 and a fifth screen 755, if the user continues holding the first direction input, an effect in which an applied score increases may be applied to a Yes icon 761 over a time when the first direction input is held.

On the fourth screen 754, if the first direction input is held during time T1, a specified first score (e.g., a star rating of 3) may be applied to the Yes icon 761*a*. Thus, a level in which a rating degree for a selection of the user is middle may be displayed.

On the fifth screen 755, if the first direction input is held during time T2, a specified second score (e.g., a star rating of 5) may be applied to the Yes icon 761*b*. Thus, a level in which a rating degree for a selection of the user is relatively high may be displayed.

According to various embodiments, a score displayed on the Yes icon 761 or the No icon 762 may sequentially increase in proportion to a duration of a user input or may increase at a specified interval.

Figure 8A:
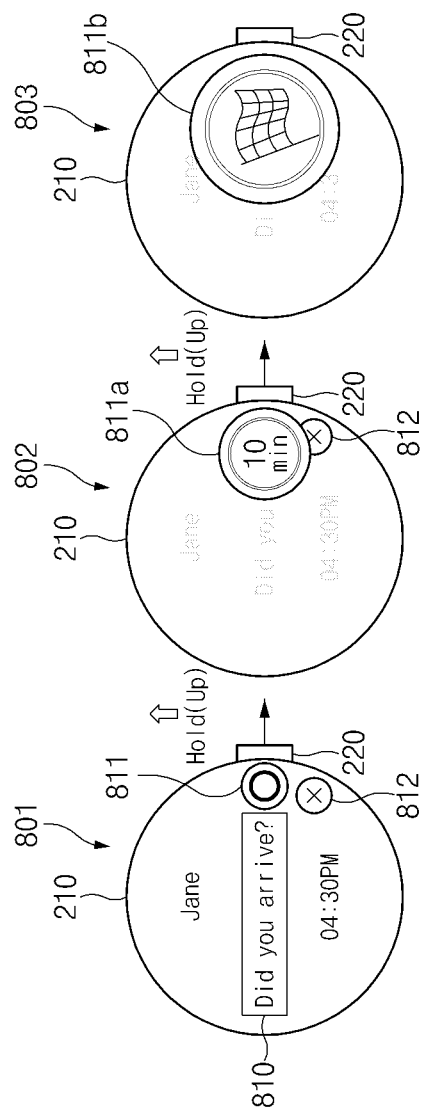
FIGS. 8A, 8B, and 8C are drawings illustrating changing a reply message depending on a duration of an input or the number of times that the input occurs, according to various embodiments of the present disclosure.
Figure 8B:
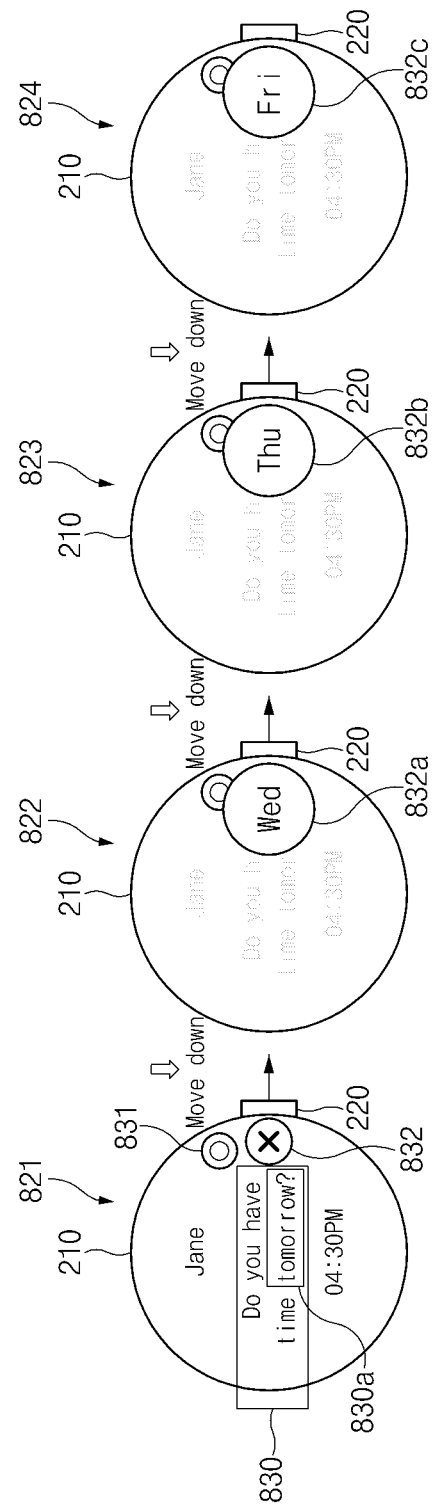
Figure 8C:
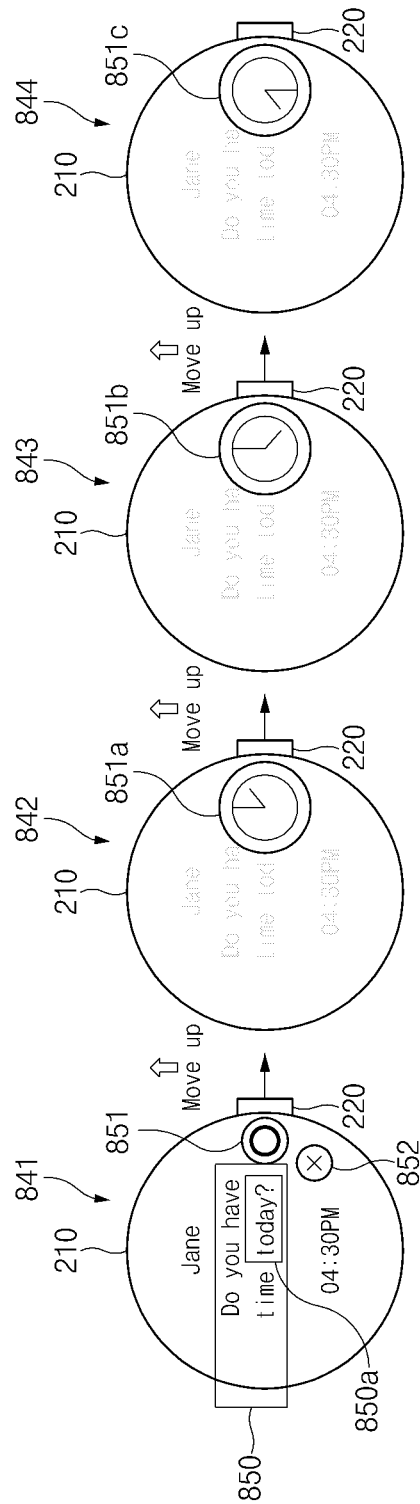

FIGS. 8A to 8C are drawings illustrating changing a reply message depending on a duration of an input or the number of times that the input occurs, according to various embodiments of the present disclosure. FIGS. 8A to 8C are, but are not limited to, examples.

Referring to FIG. 8A, a wearable electronic device 201 of FIG. 3 may analyze contents of a received message 810 and may change a corresponding replay message. For example, if the received message 810 is recognized in the form of a question for verifying whether a user arrives, including "arrive", the wearable electronic device 201 may generate a replay message (or a Yes/No message) about a change in time for each minute (e.g., 10 minutes, 5 minutes, 1 minute, arrival completion, and the like) in response to an input of the user.

On a first screen 801, the wearable electronic device 201 may receive a message 810 including a Yes/No question from an external device. A Yes icon 811 and a No icon 812 is provided.

On a second screen 802 and a third screen 803, if the user generates a first direction input (e.g., an up input) to a shuttle button 220 and holds the first direction input during a specified time, the Yes icon 811 may be changed in an order of 10 minutes icon 811a before arrival, an arrival completion icon 811b, and the like.

Referring to FIG. 8B, the wearable electronic device 201 may analyze contents of a received message 830 and may change a corresponding replay message. For example, if the received message 830 is recognized in the form of a question about a schedule including "tomorrow", the wearable electronic device 201 may generate a replay message (or a Yes/No message) about a change in time for each day (e.g., a day of the week, a date, and the like) in response to an input of the user.

On a first screen 821, the wearable electronic device 201 may receive a message 830 including a Yes/No question from the external device. The wearable electronic device 201 may recognize a keyword 830a included in the message 830. A Yes icon 831 and a No icon 832 is provided.

On second to fourth screens 822, 823, and 824, if the user generates a second direction input (e.g., a down input) to the shuttle button 220 and holds the second direction input during a specified time, the No icon 832 may be changed in an order of Wednesday 832a, Thursday 832b, Friday 832c, and the like. The user may stop the input to the shuttle button 220 on a day of the week he or she is available and may simply transmit a reply message.

Referring to FIG. 8C, the wearable electronic device 201 may analyze contents of a received message 850 and may change a corresponding replay message. For example, if the received message 850 is recognized in the form of a question about a schedule including "today", the wearable electronic device 201 may generate a replay message (or a Yes/No message) about a change in time for each hour in response to an input of the user.

On a first screen 841, the wearable electronic device 201 may receive a message 850 including a Yes/No question from the external device. The wearable electronic device 201 may recognize a keyword 850a included in the message 850. A Yes icon 851 and a No icon 852 is provided.

On second to fourth screens 842, 843, and 844, if the user generates a first direction input (e.g., an up input) to the shuttle button 220 and holds the first direction input during a specified time, the Yes icon 851 may be changed in an order of forward hours (e.g., 2 o'clock 851a, 4 o'clock 851b, 6 o'clock 851c, and the like). The user may stop the input to the shuttle button 220 on an hour he or she is available and may simply transmit a reply message.

Figure 9A:
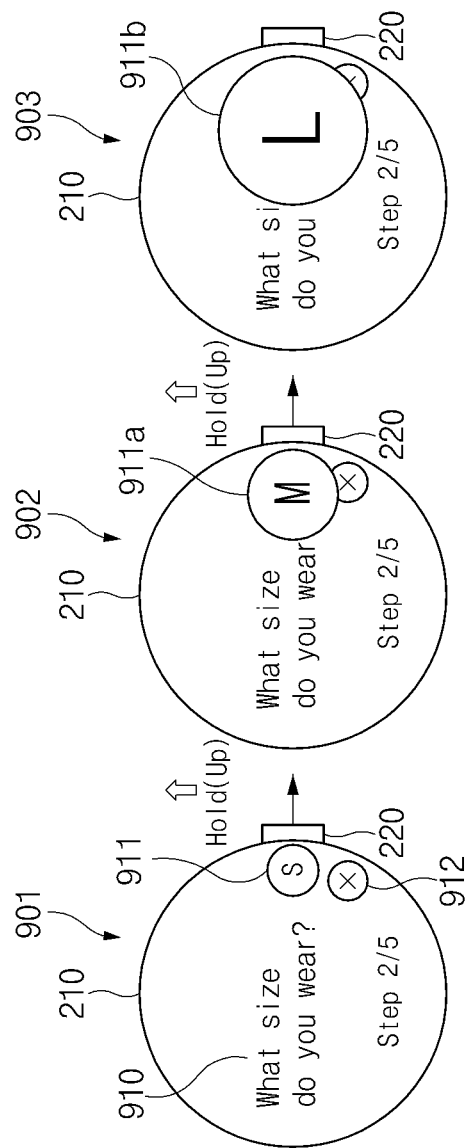
FIGS. 9A and 9B are drawings illustrating applying a reply message to an interactive question message according to various embodiments of the present disclosure.
Figure 9B:
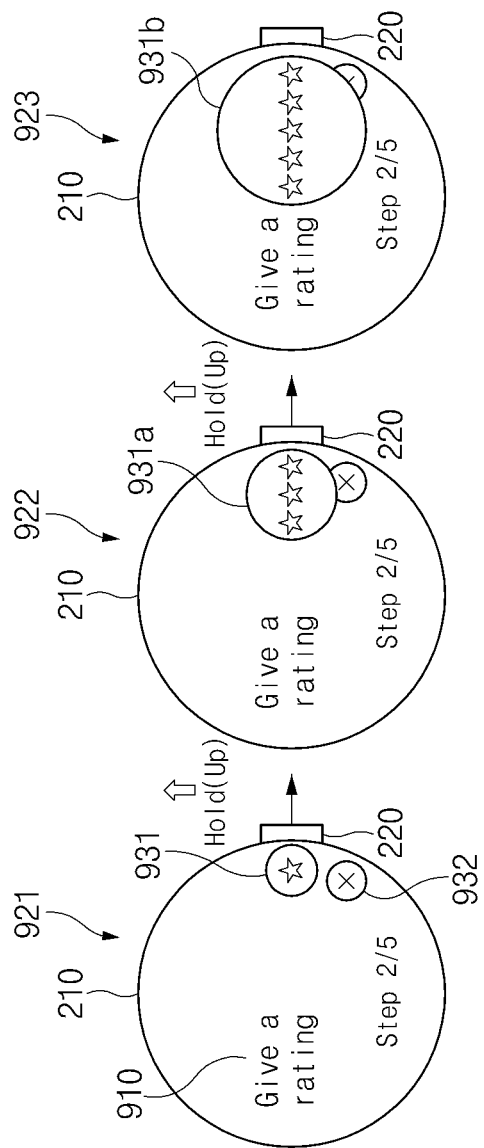

FIGS. 9A and 9B are drawings illustrating applying a reply message to an interactive question message according to various embodiments of the present disclosure. FIGS. 9A and 9B are, but are not limited to, examples.

Referring to FIG. 9A, although a received message 910 is not a Yes/No question message, if contents of a reply message are preset to be sequentially changed, a wearable electronic device 201 of FIG. 3 may apply an easy message mode.

For example, as a result of analyzing the received message 910, if the message 910 is verified as a message capable of sequentially corresponding, the wearable electronic device 201 may generate a reply message (or a Yes/No icon) about a change (e.g., small/large/medium, 1/2/3, 10/20/30, or the like) in predetermined grade in response to an input of a user.

On a first screen 901, the wearable electronic device 201 may receive the message 910 including a question about a size. The wearable electronic device 201 may analyze a keyword included in the message 910 and may verify whether to store a corresponding reply. A grade icon 911 and a No icon 912 is provided.

On a second screen 902 and a third screen 903, if the user generates a first direction input (e.g., an up input) to a shuttle button 220 and holds the first direction input during a specified time, the grade icon 911 may be changed in an order of small 911, medium 911a, large 911b, and the like.

Referring to FIG. 9B, although a received message 930 is not a question message, if contents of a reply message are preset to be sequentially changed, the wearable electronic device 201 may apply the easy message mode.

For example, as a result of analyzing the received message 930, if the message 930 is verified as a message capable of sequentially corresponding, the wearable electronic device 201 may generate a reply message (or a Yes/No icon) about a change (e.g., 1-5, 10-15, or the like) in predetermined range in response to an input of the user.

On a first screen 921, the wearable electronic device 201 may receive the message 930 for requesting a rating. The wearable electronic device 201 may analyze a keyword included in the message 930 and may verify whether to store a corresponding reply. A grade icon 931 and a No icon 932 is provided.

On a second screen 922 and a third screen 923, if the user generates a first direction input (e.g., an up input) to the shuttle button 220 and holds the first direction input during a specified time, the grade icon 931 may be changed in an order of 1 point 931, 3 points 931a, 5 points 931b, and the like.

FIGS. 10A and 10B are drawings illustrating a reply message in which time information is reflected, according to various embodiments of the present disclosure. FIGS. 10A and 10B are, but are not limited to, examples.

Referring to FIG. 10A, a wearable electronic device 201 of FIG. 3 may change a reply message based on current time information. For example, if a time when a reply message is transmitted is daytime, the wearable electronic device 201 may reflect a daytime background image in a background of the reply message (or a Yes/No icon).

On a first screen 1001, the wearable electronic device 201 may receive a message including a Yes/No question from an external device. A Yes icon 1011 and a No icon 1012 is provided.

On a second screen 1002 and a third screen 1003, if a user generates a first direction input (e.g., an up input) to a shuttle button 220 and holds the first direction input during a specified time, the Yes icon 1011 may become a larger Yes icon 1011a and an even larger Yes icon 1011b in a state where it includes a daytime background image.

Referring to FIG. 10B, the wearable electronic device 201 may change a reply message based on current time information. For example, if a time when a reply message is transmitted is night-time, the wearable electronic device 201 may reflect a night-time background image in a background of the reply message (or the Yes/No icon).

On a first screen 1021, the wearable electronic device 201 may receive a message including a Yes/No question from the external device. A Yes icon 1031 and a No icon 1032 is provided.

On a second screen 1022 and a third screen 1023, if the user generates a first direction input (e.g., an up input) to the shuttle button 220 and holds the first direction input during a specified time, the Yes icon 1031 may become a larger Yes icon 1031a and an even larger Yes icon 1031b in a state where it includes a night-time background image.

Figure 11A:
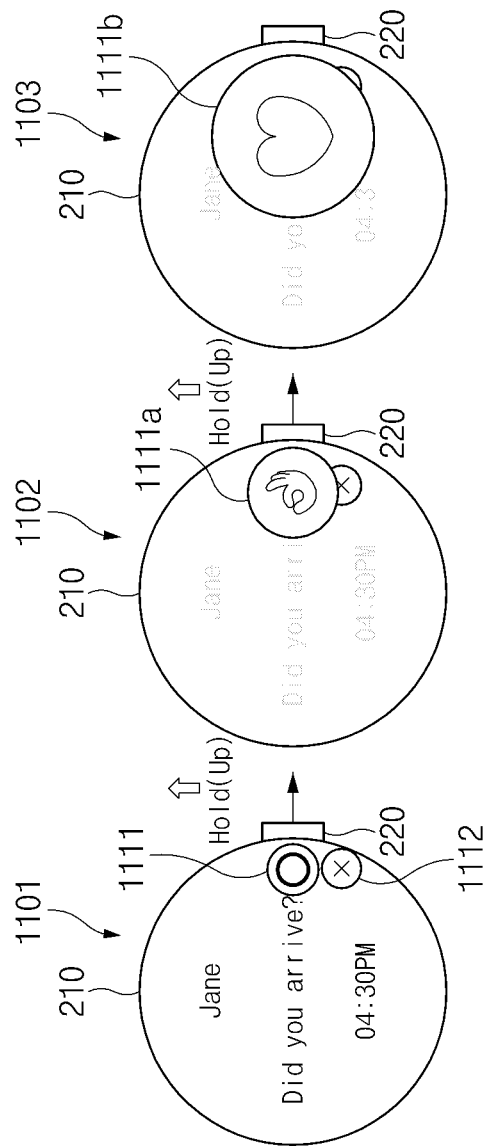
FIGS. 11A and 11B are drawings illustrating changing a reply message using an emoticon according to various embodiments of the present disclosure.
Figure 11B:
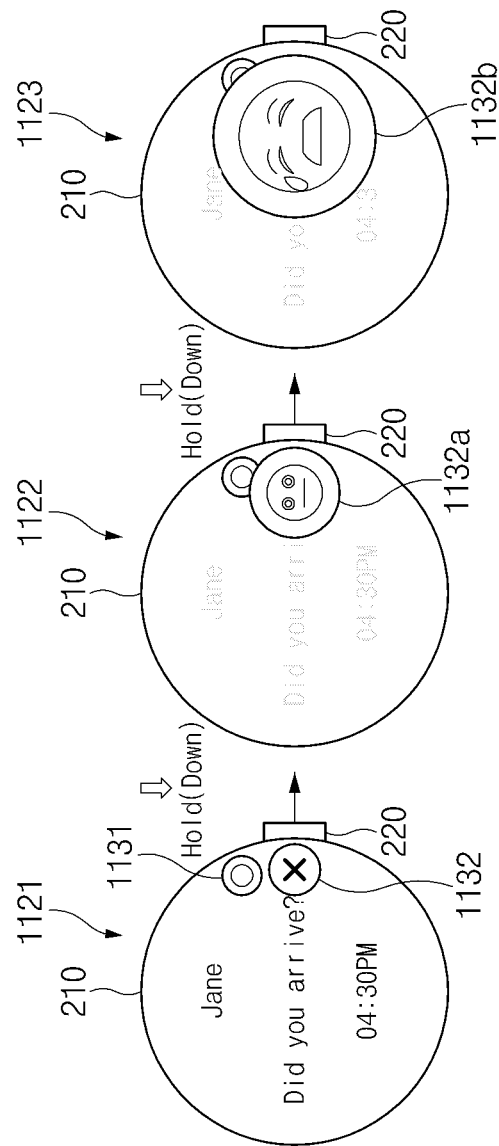

FIGS. 11A and 11B are drawings illustrating changing a reply message using an emoticon according to various embodiments of the present disclosure. FIGS. 11A and 11B are, but are not limited to, examples.

Referring to FIGS. 11A and 11B, a wearable electronic device 201 of FIG. 3 may change a reply message using various emoticons, a size/color/form/motion/motion speed of which is changed.

Referring to FIG. 11A, if transmitting a Yes reply message, the wearable electronic device 201 may generate a reply message using previously stored emoticons, each of which has a sequentially increased application effect.

On a first screen 1101, the wearable electronic device 201 may receive a message including a Yes/No question from an external device. A Yes icon 1111 and a No icon 1112 is provided.

On a second screen 1102 and a third screen 1103, if a user generates a first direction input (e.g., an up input) to a shuttle button 220 and holds the first direction input during a specified time, the Yes icon 1111 may be changed in an order of a hand-shaped emoticon 1111a, a heart-shaped emoticon 1111b, and the like.

Referring to FIG. 11B, if transmitting a No reply message, the wearable electronic device 201 may generate a reply message using previously stored emoticons, each of which has a sequentially increased application effect.

On a first screen 1121, the wearable electronic device 201 may receive a message including a Yes/No question from the external device. A Yes icon 1131 and a No icon 1132 is provided.

On a second screen 1122 and a third screen 1123, if the user generates a second direction input (e.g., a down input) to the shuttle button 220 and holds the second direction input during a specified time, the No icon 1132 may be changed in an order of a sorrow emoticon 1132a, a cry emoticon 1132b, and the like.

FIGS. 12A and 12B are drawings illustrating changing a reply message using information about a counterpart according to various embodiments of the present disclosure. FIGS. 12A and 12B are, but are not limited to, examples.

Referring to FIGS. 12A and 12B, a wearable electronic device 201 of FIG. 3 may change a reply message based on information about a counterpart (e.g., a group included on an address book, the number of call connections, or the like).

Referring to FIG. 12A, if transmitting a Yes reply message and if information about the counterpart is changed, the wearable electronic device 201 may generate a reply message in which the changed contents are reflected in real time.

On a first screen 1201, the wearable electronic device 201 may receive a message including a Yes/No question from an external device. A Yes icon 1211 and a No icon 1212 is provided.

On a second screen 1202 and a third screen 1203, if a user generates a first direction input (e.g., an up input) to a shuttle button 220 and holds the first direction input during a specified time, the wearable electronic device 201 may deepen a color of a background image based on the number of call connections or may apply a colorful pattern. If the number of times that the user sends a message increases, the wearable electronic device 201 may change a color or pattern in real time.

Referring to FIG. 12B, if transmitting a No reply message and if information about the counterpart is changed, the wearable electronic device 201 may generate a reply message in which the changed contents are reflected in real time.

On a first screen 1221, the wearable electronic device 201 may receive a message including a Yes/No question from the external device. A Yes icon 1231 and a No icon 1232 is provided.

On a second screen 1222 and a third screen 1223, if the user generates a second direction input (e.g., a down input) to the shuttle button 220 and holds the second direction input during a specified time, the wearable electronic device 201 may deepen a color of a background image based on the number of call connections or may apply a colorful pattern. If the number of times that the user sends a message increases, the wearable electronic device 201 may change a color or pattern in real time.

Figure 13A:
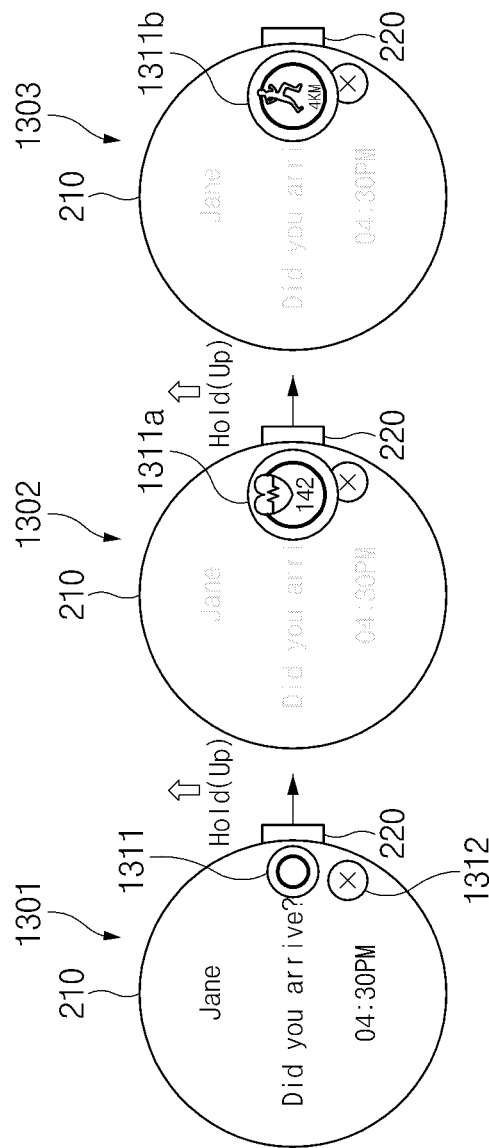
FIGS. 13A and 13B are drawings illustrating changing a reply message based on sensing information about a user according to various embodiments of the present disclosure.
Figure 13B:
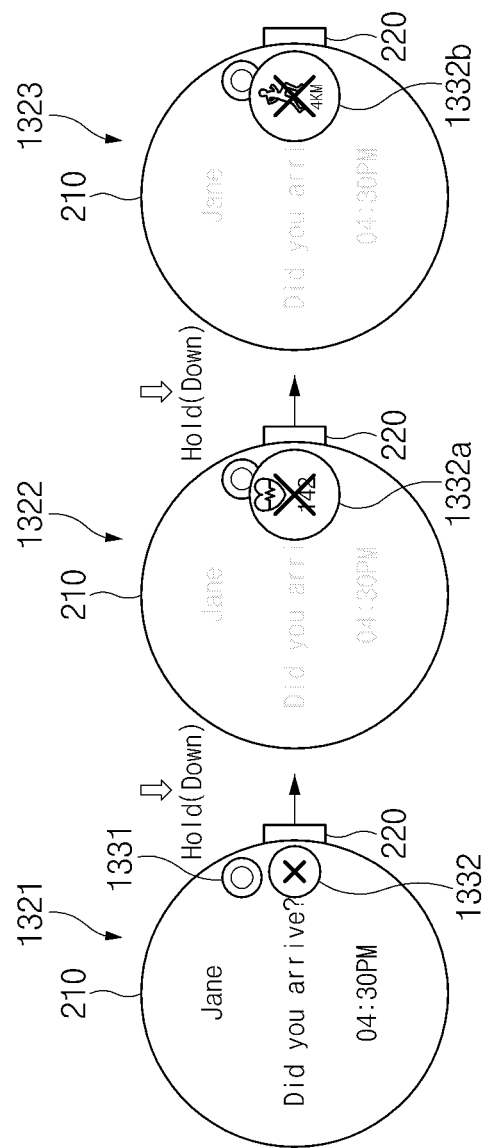

FIGS. 13A and 13B are drawings illustrating changing a reply message based on sensing information about a user according to various embodiments of the present disclosure. FIGS. 13A and 13B are, but are not limited to, examples.

Referring to FIGS. 13A and 13B, a wearable electronic device 201 of FIG. 3 may change a reply message based on information (e.g., heart rate information, movement information, or the like) about a user.

Referring to FIG. 13A, if transmitting a Yes reply message, the wearable electronic device 201 may apply an emoticon or image of information about the user recognized by a sensor to the reply message.

On a first screen 1301, the wearable electronic device 201 may receive a message including a Yes/No question from an external device. A Yes icon 1311 and a No icon 1312 is provided.

On a second screen 1302 and a third screen 1303, if the user generates a first direction input (e.g., an up input) to a shuttle button 220 and holds the first direction input during a specified time, the wearable electronic device 201 may display the Yes icon 1311 including heart rate information as a Yes heart rate icon 1311a, movement distance information as a Yes movement distance icon 1311b, or the like of the user.

Referring to FIG. 13B, if transmitting a No reply message, the wearable electronic device 201 may apply an emoticon or image of information about the user recognized by the sensor to the reply message.

On a first screen 1321, the wearable electronic device 201 may receive a message including a Yes/No question from the external device. A Yes icon 1331 and a No icon 1332 is provided.

On a second screen 1322 and a third screen 1323, if the user generates a second direction input (e.g., a down input) to the shuttle button 220 and holds the second direction input during a specified time, the wearable electronic device 201 may display the No icon 1332 including heart rate information as a No heart rate icon 1332a, movement distance information as a No movement distance icon 1332b, or the like of the user.

Figure 14:
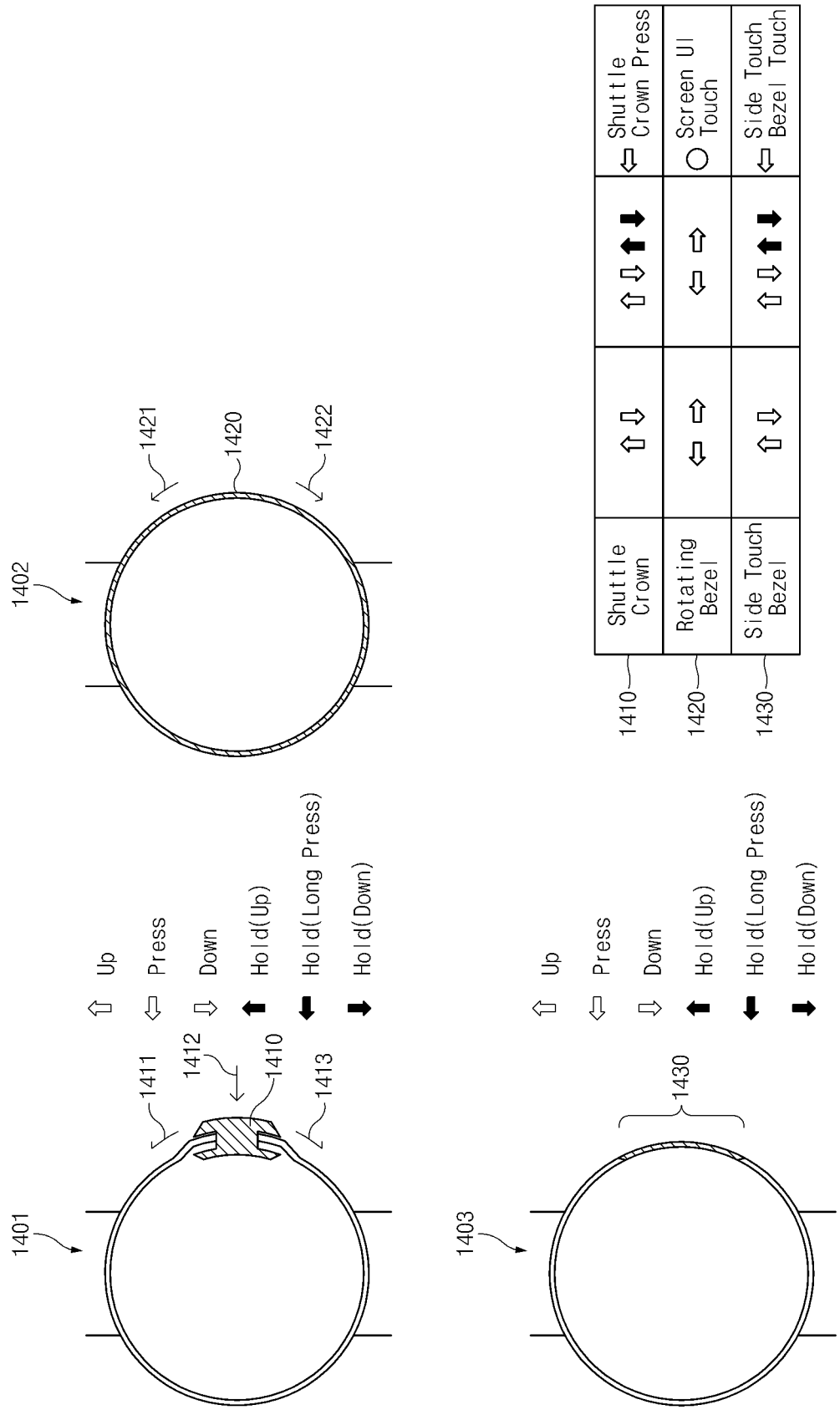
FIG. 14 is a drawing illustrating various input devices according to various embodiments of the present disclosure.

FIG. 14 is a drawing illustrating various input devices according to various embodiments of the present disclosure. FIG. 14 is, but is not limited to, an example.

Referring to FIG. 14, an electronic device 1401 may generate a reply message using a shuttle button 1410. The shuttle button 1410 may generate different input signals depending on a first direction input 1411, a second direction input 1413, and a press input 1412. Further, the shuttle button 1410 may generate a different input signal depending to a duration of each input (e.g., a hold input).

An electronic device 1402 may generate a reply message using a rotatable bezel wheel 1420. The bezel wheel 1420 may generate different input signals depending on a first direction rotation input 1421, a second direction rotation input 1422, and a screen touch input (not shown). Further, the bezel wheel 1420 may generate a different input signal depending to a duration of each input (e.g., a hold input).

An electronic device 1403 may generate a reply message using a bezel touch region 1430 for recognizing a touch of a user on a portion of a bezel. The bezel touch region 1430 may generate different input signals depending on a first direction swipe input 1431, a second direction swipe input 1432, and a bezel touch input 1433. Further, the bezel touch region 1430 may generate a different input signal depending to a duration of each input (e.g., a hold input).

Figure 15:
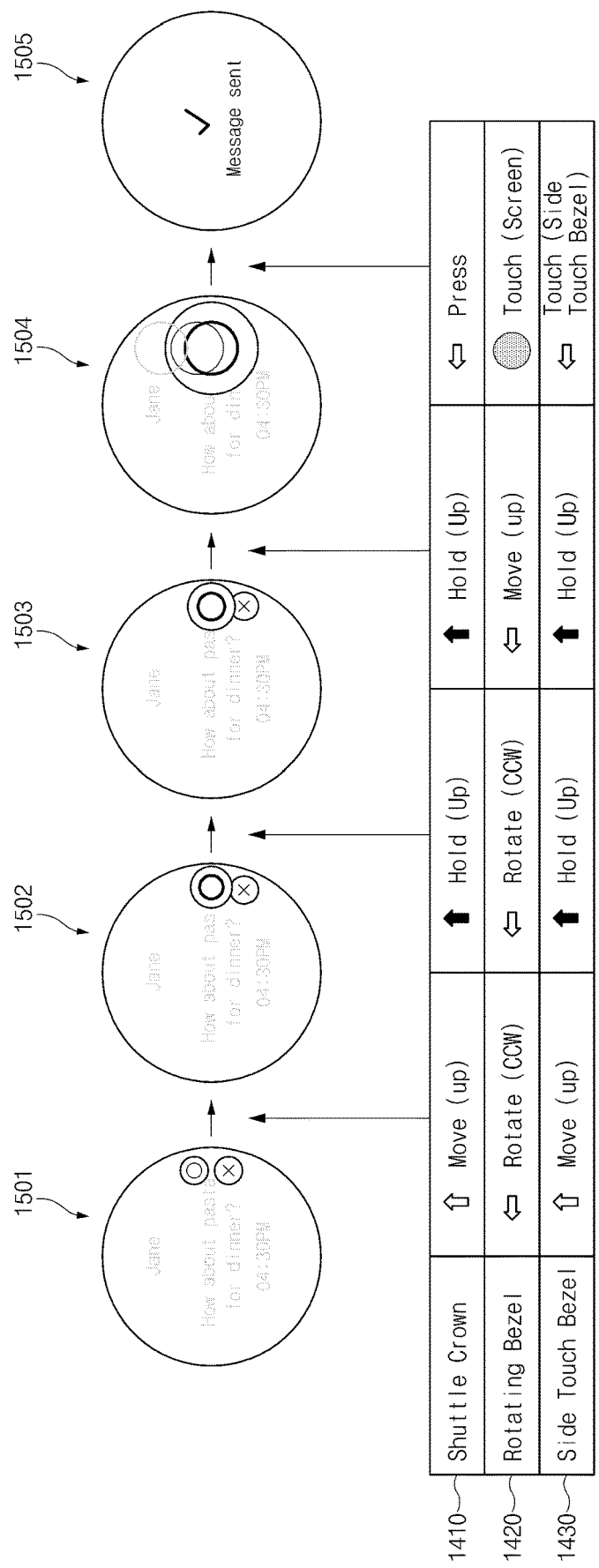
FIG. 15 is a drawing illustrating changing a reply message based on an input of each input device according to various embodiments of the present disclosure.

FIG. 15 is a drawing illustrating changing a reply message based on an input of each input device according to various embodiments of the present disclosure. FIG. 15 is, but is not limited to, an example.

Referring to FIG. 15, on a first screen 1501, a wearable electronic device 1401, 1402, or 1403 of FIG. 14 may receive a message including a Yes/No question from an external device.

On a second screen 1502, if a user generates a first direction input, a Yes icon 1511 may be selected. The first direction input may be a first direction input 1411 of a shuttle button 1410, a first direction rotation input 1421 of a bezel wheel 1420, or a first direction swipe input 1431 of a bezel touch region 1430, shown in FIG. 14.

On a third screen 1503 and a fourth screen 1504, if the user continues holding the first input, the Yes icon 1511 may increase in size or an animation effect may be applied.

On a fifth screen 1505, if the user generates a press input or a touch input, a first reply message (e.g., a circular emoticon) corresponding to the Yes icon 1511 may be transmitted to the external device. If the press input or the touch input may be a press input 1413 of the shuttle button 1410, a screen touch input (not shown) of the bezel wheel 1420, or a bezel touch input 1433 of the bezel touch region 1430, shown in FIG. 14.

Figure 16:
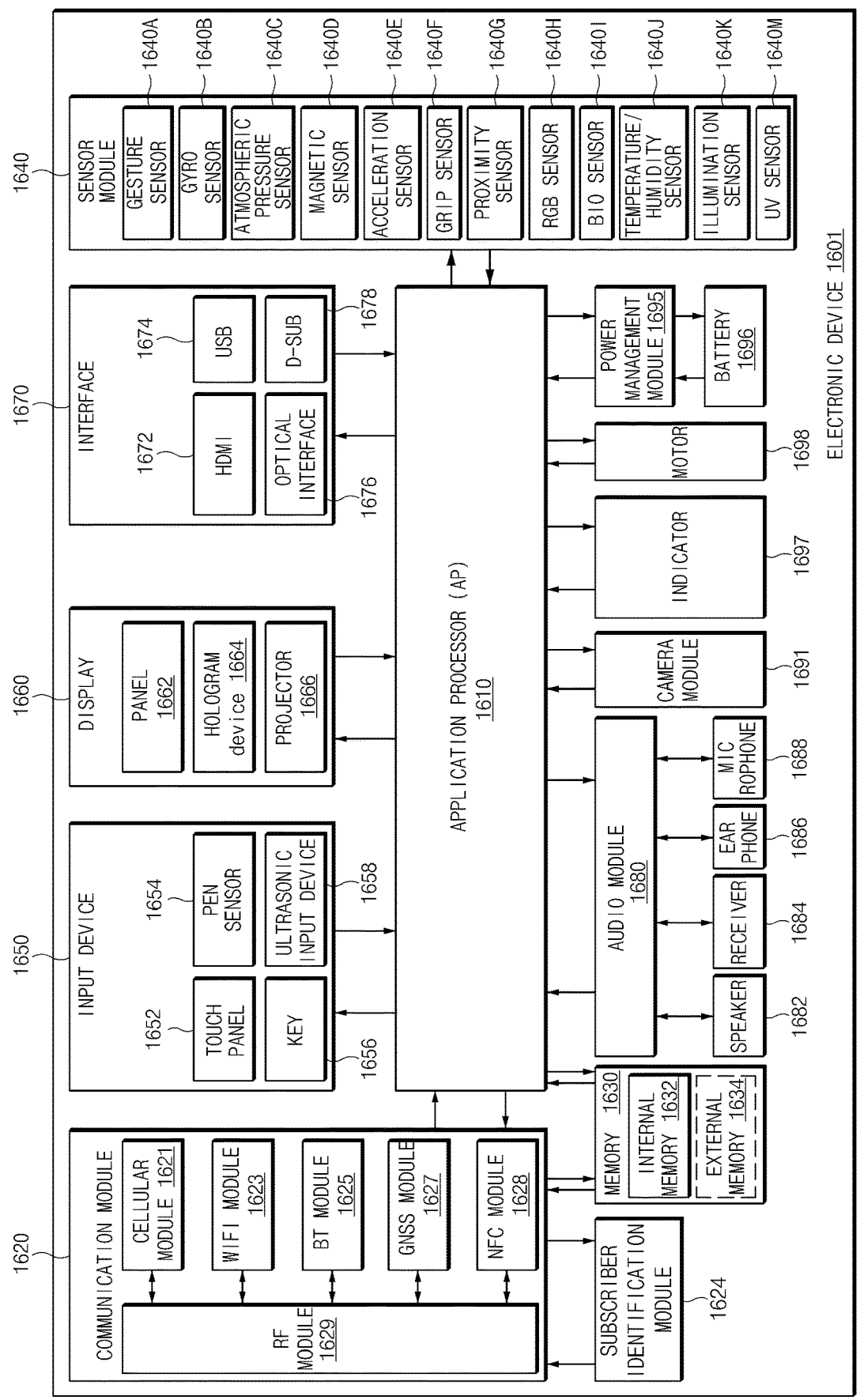
FIG. 16 is a block diagram illustrating a configuration of an electronic device according to various embodiments of the present disclosure.

FIG. 16 is a block diagram illustrating an electronic device according to an embodiment of the present disclosure.

Referring to FIG. 16, an electronic device 1601 may include, for example, a part or the entirety of the wearable electronic device 101 illustrated in FIG. 1. The electronic device 1601 may include at least one processor (e.g., AP) 1610, a communication module 1620, a subscriber identification module (SIM) 1624, a memory 1630, a sensor module 1640, an input device 1650, a display 1660, an interface 1670, an audio module 1680, a camera module 1691, a power management module 1695, a battery 1696, an indicator 1697, and a motor 1698.

The processor 1610 may run an OS or an application program so as to control a plurality of hardware or software elements connected to the processor 1610, and may process various data and perform operations. The processor 1610 may be implemented with, for example, a system on chip (SoC). According to an embodiment of the present disclosure, the processor 1610 may further include a graphic processing unit (GPU) and/or an image signal processor (ISP). The processor 1610 may include at least a portion (e.g., a cellular module 1621) of the elements illustrated in FIG. 16. The processor 1610 may load, on a volatile memory, an instruction or data received from at least one of other elements (e.g., a nonvolatile memory) to process the instruction or data, and may store various data in a nonvolatile memory.

The communication module 1620 may have a configuration that is the same as or similar to that of the communication interface 170 of FIG. 1. The communication module 1620 may include, for example, a cellular module 1621, a Wi-Fi module 1623, a Bluetooth (BT) module 1625, a GNSS module 1627 (e.g., a GPS module, a GLONASS module, a BeiDou module, or a Galileo module), a NFC module 1628, and a radio frequency (RF) module 1629.

The cellular module 1621 may provide, for example, a voice call service, a video call service, a text message service, or an Internet service through a communication network. The cellular module 1621 may identify and authenticate the electronic device 1601 in the communication network using the subscriber identification module 1624 (e.g., a SIM card). The cellular module 1621 may perform at least a part of functions that may be provided by the processor 1610. The cellular module 1621 may include a CP.

Each of the Wi-Fi module 1623, the BT module 1625, the GNSS module 1627 and the NFC module 1628 may include, for example, a processor for processing data transmitted/received through the modules. According to some various embodiments of the present disclosure, at least a part (e.g., two or more) of the cellular module 1621, the Wi-Fi module 1623, the BT module 1625, the GNSS module 1627, and the NFC module 1628 may be included in a single integrated chip (IC) or IC package.

The RF module 1629 may transmit/receive, for example, communication signals (e.g., RF signals). The RF module 1629 may include, for example, a transceiver, a power amp module (PAM), a frequency filter, a low noise amplifier (LNA), an antenna, or the like. According to another embodiment of the present disclosure, at least one of the cellular module 1621, the Wi-Fi module 1623, the BT module 1625, the GNSS module 1627, or the NFC module 1628 may transmit/receive RF signals through a separate RF module.

The SIM 1624 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1630 (e.g., the memory 130) may include, for example, an internal memory 1632 or an external memory 1634. The internal memory 1632 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1634 may include a flash drive such as a compact flash (CF), a secure digital (SD), a micro-SD, a mini-SD, an extreme digital (xD), a multi-media card (MMC), a memory stick, or the like. The external memory 1634 may be operatively and/or physically connected to the electronic device 1601 through various interfaces.

The sensor module 1640 may, for example, measure physical quantity or detect an operation state of the electronic device 1601 so as to convert measured or detected information into an electrical signal. The sensor module 1640 may include, for example, at least one of a gesture sensor 1640A, a gyro sensor 1640B, a barometric pressure sensor 1640C, a magnetic sensor 1640D, an acceleration sensor 1640E, a grip sensor 1640F, a proximity sensor 1640G, a color sensor 1640H (e.g., a red/green/blue (RGB) sensor), a biometric sensor 1640I, a temperature/humidity sensor 1640J, an illumination sensor 1640K, or an ultraviolet (UV) sensor 1640M. Additionally or alternatively, the sensor module 1640 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1640 may further include a control circuit for controlling at least one sensor included therein. In some various embodiments of the present disclosure, the electronic device 1601 may further include a processor configured to control the sensor module 1640 as a part of the processor 1610 or separately, so that the sensor module 1640 is controlled while the processor 1610 is in a sleep state.

The input device 1650 may include, for example, a touch panel 1652, a (digital) pen sensor 1654, a key 1656, or an ultrasonic input device 1658. The touch panel 1652 may employ at least one of capacitive, resistive, infrared, and ultraviolet sensing methods. The touch panel 1652 may further include a control circuit. The touch panel 1652 may further include a tactile layer so as to provide a haptic feedback to a user.

The (digital) pen sensor 1654 may include, for example, a sheet for recognition which is a part of a touch panel or is separate. The key 1656 may include, for example, a physical button, an optical button, or a keypad. The ultrasonic input device 1658 may sense ultrasonic waves generated by an input tool through a microphone 1688 so as to identify data corresponding to the ultrasonic waves sensed.

The display 1660 (e.g., the display 160) may include a panel 1662, a hologram device 1664, or a projector 1666. The panel 1662 may have a configuration that is the same as or similar to that of the display 160 of FIG. 1. The panel 1662 may be, for example, flexible, transparent, or wearable. The panel 1662 and the touch panel 1652 may be integrated into a single module. The hologram device 1664 may display a stereoscopic image in a space using a light interference phenomenon. The projector 1666 may project light onto a screen so as to display an image. The screen may be disposed in the inside or the outside of the electronic device 1601. According to an embodiment of the present disclosure, the display 1660 may further include a control circuit for controlling the panel 1662, the hologram device 1664, or the projector 1666.

The interface 1670 may include, for example, an HDMI 1672, a USB 1674, an optical interface 1676, or a D-sub-miniature (D-sub) 1678. The interface 1670, for example, may be included in the communication interface 170 illustrated in FIG. 1. Additionally or alternatively, the interface 1670 may include, for example, a mobile high-definition link (MHL) interface, an SD card/MMC interface, or an infrared data association (IrDA) interface.

The audio module 1680 may convert, for example, a sound into an electrical signal or vice versa. At least a portion of elements of the audio module 1680 may be included in the input/output interface 150 illustrated in FIG. 1. The audio module 1680 may process sound information input or output through a speaker 1682, a receiver 1684, an earphone 1686, or the microphone 1688.

The camera module 1691 is, for example, a device for shooting a still image or a video. According to an embodiment of the present disclosure, the camera module 1691 may include at least one image sensor (e.g., a front sensor or a rear sensor), a lens, an ISP, or a flash (e.g., an LED or a xenon lamp).

The power management module 1695 may manage power of the electronic device 1601. According to an embodiment of the present disclosure, the power management module 1695 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1696 and a voltage, current or temperature thereof while the battery is charged. The battery 1696 may include, for example, a rechargeable battery and/or a solar battery.

The indicator 1697 may display a specific state of the electronic device 1601 or a part thereof (e.g., the processor 1610), such as a booting state, a message state, a charging state, or the like. The motor 1698 may convert an electrical signal into a mechanical vibration, and may generate a vibration or haptic effect. Although not illustrated, a processing device (e.g., a GPU) for supporting a mobile TV may be included in the electronic device 1601. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 17:
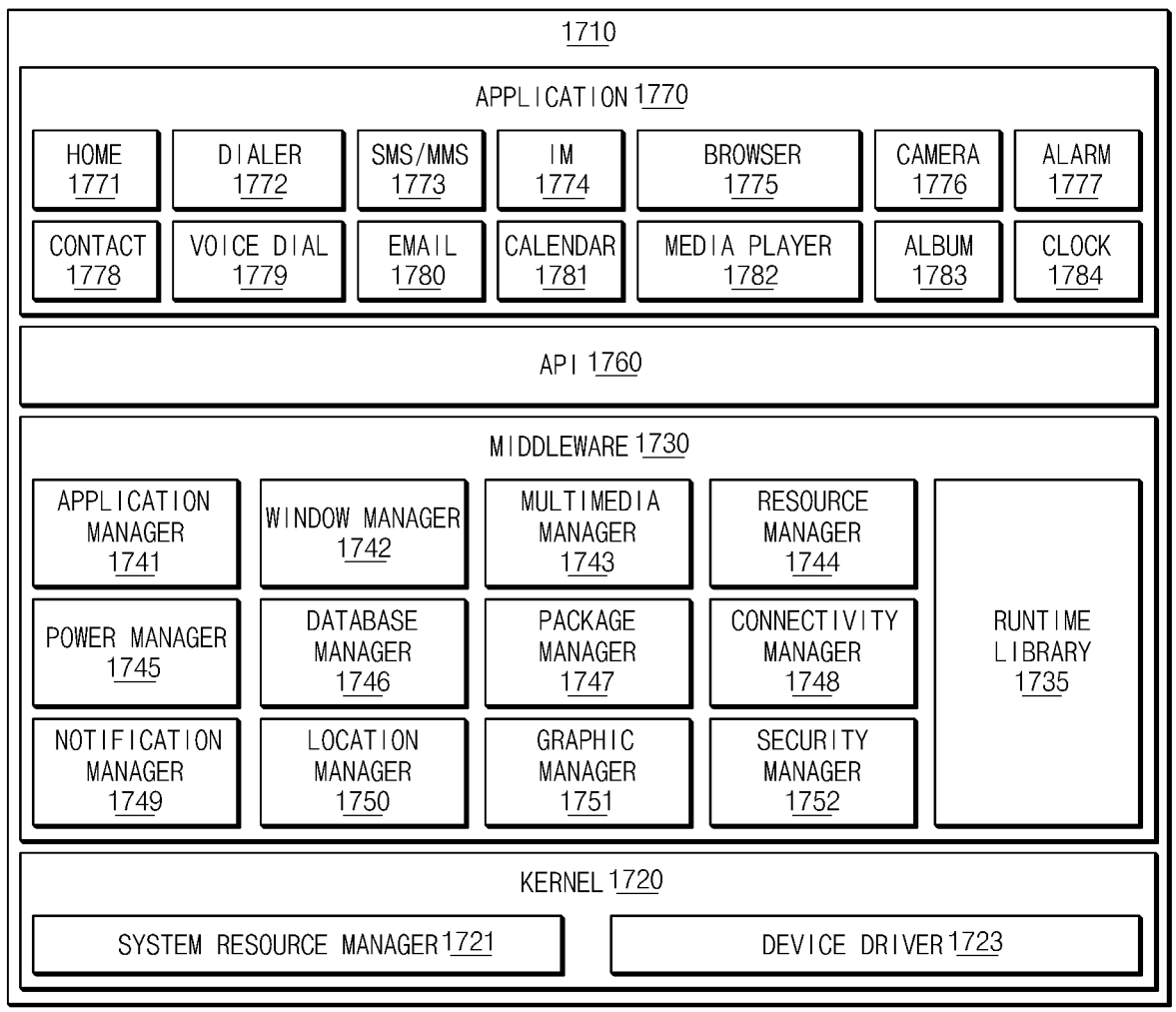
FIG. 17 is a block diagram illustrating a configuration of a program module according to various embodiments of the present disclosure.

FIG. 17 is a block diagram illustrating a program module according to an embodiment of the present disclosure.

Referring to FIG. 17, a program module 1710 (e.g., the program 140) may include an OS for controlling a resource related to an electronic device (e.g., the wearable electronic device 101) and/or various applications (e.g., the application program 147) running on the OS. The OS may be, for example, Android, iOS, Windows, Symbian, Tizen, or the like.

The program module 1710 may include a kernel 1720, a middleware 1730, an API 1760, and/or an application 1770. At least a part of the program module 1710 may be preloaded on an electronic device or may be downloaded from an external electronic device (e.g., the first electronic device 102, the second external electronic device 104, or the server 106).

The kernel 1720 (e.g., the kernel 141) may include, for example, a system resource manager 1721 or a device driver 1723. The system resource manager 1721 may perform control, allocation, or retrieval of a system resource. According to an embodiment of the present disclosure, the system resource manager 1721 may include a process management unit, a memory management unit, a file system management unit, or the like. The device driver 1723 may include, for example, a display driver, a camera driver, a BT driver, a shared memory driver, a USB driver, a keypad driver, a Wi-Fi driver, an audio driver, or an inter-process communication (IPC) driver.

The middleware 1730, for example, may provide a function that the applications 1770 require in common, or may provide various functions to the applications 1770 through the API 1760 so that the applications 1770 may efficiently use limited system resources in the electronic device. According to an embodiment of the present disclosure, the middleware 1730 (e.g., the middleware 143) may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, and a security manager 1752.

The runtime library 1735 may include, for example, a library module that a complier uses to add a new function through a programming language while the application 1770 is running. The runtime library 1735 may perform a function for input/output management, memory management, or an arithmetic function.

The application manager 1741 may mange, for example, a life cycle of at least one of the applications 1770. The window manager 1742 may manage a GUI resource used in a screen. The multimedia manager 1743 may recognize a format required for playing various media files and may encode or decode a media file using a codec matched to the format. The resource manager 1744 may manage a resource such as a source code, a memory, or a storage space of at least one of the applications 1770.

The power manager 1745, for example, may operate together with a basic input/output system (BIOS) to manage a battery or power and may provide power information required for operating the electronic device. The database manager 1746 may generate, search, or modify a database to be used in at least one of the applications 1770. The package manager 1747 may manage installation or update of an application distributed in a package file format.

The connectivity manger 1748 may manage wireless connection of Wi-Fi, BT, or the like. The notification manager 1749 may display or notify an event such as message arrival, appointments, and proximity alerts in such a manner as not to disturb a user. The location manager 1750 may manage location information of the electronic device. The graphic manager 1751 may manage a graphic effect to be provided to a user or a UI related thereto. The security manager 1752 may provide various security functions required for system security or user authentication. According to an embodiment of the present disclosure, in the case in which an electronic device (e.g., the wearable electronic device 101) includes a phone function, the middleware 1730 may further include a telephony manager for managing a voice or video call function of the electronic device.

The middleware 1730 may include a middleware module for forming a combination of various functions of the above-mentioned elements. The middleware 1730 may provide a module specialized for each type of an OS to provide differentiated functions. Furthermore, the middleware 1730 may delete a part of existing elements or may add new elements dynamically.

The API 1760 (e.g., the API 145) which is, for example, a set of API programming functions may be provided in different configurations according to an OS. For example, in the case of Android or iOS, one API set may be provided for each platform, and, in the case of Tizen, at least two API sets may be provided for each platform.

The application 1770 (e.g., the application program 147), for example, may include at least one application capable of performing functions such as a home 1771, a dialer 1772, an short message service (SMS)/multimedia messaging service (MMS) 1773, an instant message (IM) 1774, a browser 1775, a camera 1776, an alarm 1777, a contact 1778, a voice dial 1779, an e-mail 1780, a calendar 1781, a media player 1782, an album 1783, a clock 1784, health care (e.g., measure an exercise amount or blood sugar), or environmental information provision (e.g., provide air pressure, humidity, or temperature information).

According to an embodiment of the present disclosure, the application 1770 may include an information exchange application for supporting information exchange between the electronic device (e.g., the wearable electronic device 101) and an external electronic device (e.g., the first electronic device 102 or the second external electronic device 104). The information exchange application may include, for example, a notification relay application for relaying specific information to the external electronic device or a device management application for managing the external electronic device.

For example, the notification relay application may have a function for relaying, to an external electronic device (e.g., the first electronic device 102 or the second external electronic device 104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user. 100249j The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 102 or the second external electronic device 104) communicating with the electronic device, an application running in the external electronic device, or a service (e.g., a call service, a message service, or the like) provided from the external electronic device.

According to an embodiment of the present disclosure, the application 1770 may include a specified application (e.g., a healthcare application of a mobile medical device) according to an attribute of the external electronic device (e.g., the first electronic device 102 or the second external electronic device 104). The application 1770 may include an application received from an external electronic device (e.g., the first electronic device 102 or the second external electronic device 104). The application 1770 may include a preloaded application or a third-party application downloadable from a server. The names of the elements of the program module 1710 illustrated may vary with the type of an OS.

According to various embodiments of the present disclosure, at least a part of the program module 1710 may be implemented with software, firmware, hardware, or a combination thereof. At least a part of the program module 1710, for example, may be implemented (e.g., executed) by a processor (e.g., the processor 1610). At least a part of the program module 1710 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a non-transitory computer-readable storage medium in the form of a program module. In the case where the instructions are performed by a processor (e.g., the processor 120), the processor may perform functions corresponding to the instructions. The non-transitory computer-readable storage medium may be, for example, the memory 130.

The non-transitory computer-readable recording medium may include a hard disk, a floppy disk, a magnetic medium (e.g., a magnetic tape), an optical medium (e.g., compact disc-ROM (CD-ROM), DVD), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable electronic device for transmitting and receiving a message with an external device, the wearable electronic device comprising:
    a display;
    a memory;
    a communication interface;
    a sensor configured to sense at least one of a state of the wearable electronic device or a state of a user;
    an input device configured to receive at least one of a movement input or a rotation input; and
    at least one processor,
    wherein the at least one processor is configured to:
        in response to receiving a first message from the external device, send a Yes/No question request message generated based on at least one of a time when the first message is received, information about the state of the user, or information about the state of the wearable electronic device,
        receive a second message corresponding to the Yes/No question request message from the external device, wherein the second message includes a Yes/No question,
        in response to receiving the second message, enter an easy message mode depending on a predetermined condition based on at least one of analysis information about the second message, information stored in the memory, information about the state of the wearable electronic device, or sensing information recognized by the sensor,
        analyze the second message to generate a plurality of reply messages,
        control the display to display a reply message of the plurality of reply messages, and
        in response to a user input to the input device, change the reply message of the plurality of reply messages which is displayed.

2. The wearable electronic device of claim 1, wherein the at least one processor is further configured to:
    change the display of the reply message among the plurality of reply messages based on at least one of a type of the user input, a duration of the user input, or intensity of the user input.

3. The wearable electronic device of claim 1, wherein the at least one processor is further configured to:
    apply different animation effects to the plurality of reply messages, respectively, in response to the user input.

4. The wearable electronic device of claim 3, wherein each of the plurality of reply messages is configured such that each of the animation effects sequentially increases or decreases.

5. The wearable electronic device of claim 1, wherein the at least one processor is further configured to:
    select a first reply message among the plurality of reply messages in response to a first direction input of the input device; and
    select a second reply message among the plurality of reply messages in response to a second direction input of the input device.

6. The wearable electronic device of claim 5, wherein the at least one processor is further configured to:
    transmit a message selected between the first reply message or the second reply message to the external device in response to a third direction input of the input device.

7. The wearable electronic device of claim 5, wherein the at least one processor is further configured to:
    when contents of the first reply message or the second reply message are preset to be sequentially changed, determine a change range of the first reply message or the second reply message in response to a duration in which the first direction input or the second direction input is held.

8. The wearable electronic device of claim 5, wherein the at least one processor is further configured to:

change a state of the first reply message or the second reply message based on at least one of a current time, information about the state of the user, or information about the state of the wearable electronic device.

9. The wearable electronic device of claim 5, wherein the at least one processor is further configured to:

change a state of the first reply message or the second reply message based on at least one of analysis information about the received message or information about a counterpart, the information being stored in the memory.

10. The wearable electronic device of claim 1, wherein the input device is further configured to:

receive one of a movement input of a shuttle button, a rotation input of a bezel wheel, or a touch input of a bezel.

11. A method of generating a message in a wearable electronic device, the method comprising:

receiving a first message from an external device;

sending a Yes/No question request message generated based on at least one of a time when the first message is received, information about the state of the user, or information about the state of the wearable electronic device;

receiving a second message corresponding to the Yes/No question request message from the external device, wherein the second message includes a Yes/No question;

entering an easy message mode depending on a predetermined condition based on at least one of analysis information about the second message, information stored in the memory, information about the state of the wearable electronic device, or sensing information recognized by the sensor;

analyzing the second message to generate a plurality of reply messages;

controlling the display to display a reply message of the plurality of reply messages; and in response to a user input to the input device, changing the reply message of the plurality of reply messages which is displayed.

12. The method of claim 11, wherein the changing of the display of the reply message among the plurality of reply messages comprises:

changing the display of the reply message among the plurality of reply messages based on at least one of a type of the user input, a duration of the user input, or intensity of the user input.

13. The method device of claim 11, wherein the changing of the display of the reply message among the plurality of reply messages comprises:

applying different animation effects to the plurality of reply messages, respectively, in response to the user input.

14. The method of claim 11, further comprising:

selecting a first reply message among the plurality of reply messages in response to a first direction input of the input device; and selecting a second reply message among the plurality of reply messages in response to a second direction input of the input device.

15. The method of claim 14, further comprising:

if a third direction input occurs to the input device, transmitting the first reply message or the second reply message to the external device.

* * * * *